(12) United States Patent
Honda et al.

(10) Patent No.: US 7,075,880 B2
(45) Date of Patent: Jul. 11, 2006

(54) OPTICAL PICK-UP DEVICE AND OBJECTIVE LENS USED THEREIN

(75) Inventors: Koji Honda, Tokyo (JP); Katsuya Sakamoto, Tokyo (JP); Yuichi Atarashi, Tokyo (JP); Kohei Ota, Tokyo (JP)

(73) Assignee: Konica Corporation, Tokyo (JP)

( * ) Notice: Subject to any disclaimer, the term of this patent is extended or adjusted under 35 U.S.C. 154(b) by 499 days.

(21) Appl. No.: 10/144,027

(22) Filed: May 14, 2002

(65) Prior Publication Data

US 2003/0165107 A1   Sep. 4, 2003

(30) Foreign Application Priority Data

May 17, 2001  (JP)  ............................... 2001-148313
Mar. 25, 2002  (JP)  ............................... 2002-124968

(51) Int. Cl.
  *G11B 7/135*  (2006.01)
(52) U.S. Cl. .................. 369/112.08; 369/112.04; 369/112.01; 369/112.23; 369/44.23
(58) Field of Classification Search .......... 369/112.24, 369/112.01, 112.08, 112.14, 112.25, 283, 369/44.12, 44.23, 44.32, 112.23, 112.26, 369/112.06, 112.11, 94, 118, 112.04; 359/637, 359/641, 565, 566, 722, 719, 721
See application file for complete search history.

(56) References Cited

U.S. PATENT DOCUMENTS

| | | | |
|---|---|---|---|
| 5,349,471 A * | 9/1994 | Morris et al. ................. 359/565 |
| 5,629,799 A * | 5/1997 | Maruyama et al. .......... 359/565 |
| 5,757,758 A * | 5/1998 | Yagi et al. ................ 369/112.25 |
| 5,930,219 A | 7/1999 | Kim | |
| 6,088,322 A | 7/2000 | Broome et al. | |
| 6,134,055 A * | 10/2000 | Koike ............................ 359/724 |
| 6,411,587 B1 * | 6/2002 | Arai et al. ................. 369/112.01 |
| 6,473,387 B1 * | 10/2002 | Maruyama et al. ....... 369/112.23 |
| 6,496,453 B1 * | 12/2002 | Asada et al. ................ 369/44.23 |
| 6,671,247 B1 * | 12/2003 | Arai et al. ................. 369/112.01 |
| 6,798,581 B1 * | 9/2004 | Yamamoto et al. ............ 359/637 |

FOREIGN PATENT DOCUMENTS

EP   0 936 604   8/1999

OTHER PUBLICATIONS

Search Report dated Mar. 3, 2006, from the European Patent Office in EP Application No. 02 25 3384.
Nakajima, "Oprical Pickup" Patent Abstracts of Japan of JP 10106016 dated Apr. 24, 1998.

* cited by examiner

*Primary Examiner*—Tan Dinh
*Assistant Examiner*—Kim-Kwok Chu
(74) *Attorney, Agent, or Firm*—Finnegan, Henderson, Farabow, Garrett & Dunner, L.L.P.

(57) ABSTRACT

An optical pickup apparatus conducts recording or reproducing information for an information recording plane of a first or second optical information recording medium and comprises a first light source and a second light source mounted on a same base board; a converging optical system; and a coupling lens. The converging optical system comprises an objective lens to converge a first or second light flux having passed through the coupling lens on a first or second optical information recording medium; and a diffractive structure to change a focal length in accordance with a wavelength of a light flux emitted from the first light source or the second light source.

50 Claims, 9 Drawing Sheets

SPHERICAL ABERRATION (DVD) (mm)

SPHERICAL ABERRATION (DVD) (mm)

OPTICAL PICK-UP DEVICE AND OBJECTIVE LENS USED THEREIN

BACKGROUND OF THE INVENTION

The present invention relates to an optical pick-up device and an objective lens used therein, and in particular, to an optical pick-up device, having therein a light source unit in which a plurality of light sources having different wavelengths are arranged on a single base board, and performing recording and/or reproduction of information for different optical information recording media, and an objective lens used therein.

There has been developed, for example, an interchangeable optical pick-up device which is provided with two light sources to perform the recording or reproduction of information for DVD, and to perform the recording or reproduction of information for CD. In the optical pick-up device mentioned above, there are various strict requirements such as a low price setting and miniaturization of the construction.

Incidentally, in the case of the reproduction of information stored in DVD, an optical magnification which is requested to a light-convergent optical system of the optical pick-up device is about −1/7 to −1/6, however, in the case of the recording or reproduction of information for CD, the optical magnification which is requested to the light-convergent optical system is about −1/4 to obtain a large amount of light. However, to compose the light-convergent optical system having the different optical magnifications separately cannot perform the miniaturization and low price setting for the optical pick-up device.

In the prior art, therefore, the above-mentioned different optical magnifications are attained by the following manners, that is, two optical light sources are arranged in a single light-convergent optical system separately, instead of using the different exclusive light-convergent optical system (an optical pick-up optical system) for CD and DVD respectively, and the light source for the recording of information or reproduction of information for CD is arranged closer to the light-convergent optical system than the light source for the reproduction of information for DVD, and further, in an optical path, there is provided a lens through which a only light flux for the recording or reproduction of information for CD passes.

On the contrary, when the recording on an optical disk is not regarded as important, it is not indispensable to change the optical magnification, because to obtain the light amount is not a purpose.

Further, for the interchangeable optical pick-up device, there has been developed an optical pick-up device used for the so-called combo drive, which is provided with the exclusive light sources for DVD and CD respectively, to reproduce information stored in DVD, and to record or reproduce information for CD.

On the other hand, there is developed the light source unit in which a plurality of light sources having different wavelengths are arranged on the single base board, and to use this light source unit can perform the simplification of the construction and the low cost setting of the optical pick-up device. However, in case of using this light source unit, there is a problem that the different magnifications must be established for CD and DVD respectively, though the light fluxes pass through the same optical path, because the distances from both of the light sources to the light-convergent optical system are the same.

That is, when the light source unit stated above is used for the optical pick-up device used for the above-mentioned combo drive, the optical magnification that is suitable for the reproduction for DVD is unsuitable for the reproduction and recording for CD.

Incidentally, regarding a thickness of a protection base board (transparent base board) provided on an information recording surface of the above-mentioned each optical information recording medium, the thickness for DVD is 0.6 mm, and that for CD is 1.2 mm.

When the above-mentioned light source unit is used, the distances from the light source to the information recording surfaces of the optical information recording media are nearly the same, and due to this, in the case of recording or reproducing for CD having the thicker protection base board, it is difficult to obtain a sufficient working distance (an operation distance) from an objective lens to the surface of the optical information recording medium, which is a problem.

The invention has been achieved in view of the above-mentioned problem, and the object of the invention is to provide an optical pick-up device and an objective lens used therein which can record or reproduce information for the different optical information recording media having the different thickness of the protection base boards, by using the light source unit in which a plurality of the light sources having the different wavelengths are arranged on the single base board, and by using the single light-convergent optical system.

Especially, in the optical pick-up device which can perform only the reproduction of information for the one optical information recording medium, and can perform the reproduction and recording of information for the other optical information recording medium, there is a request to make the amount of light larger for the recording, accordingly, it is preferable if the focal length can be established optionally for the optical disk used for the recording.

Further, the object of the invention is to provide an optical pick-up device which is able to obtain the working distance for the desired optical information recording medium.

SUMMARY OF THE INVENTION

An optical pick-up device mentioned in (1) is represented by an optical pick-up device having therein a light source unit in which a first light source having wavelength λ1 and a second light source having wavelength λ2 longer than the wavelength λ1 are arranged on a single base board, and a light-convergent optical system including an objective lens which performs the reproduction of information from an information recording surface, by making the light flux from the first light source to form an image on an information recording surface of a first optical information recording medium, through a protection base board having base board thickness t1, and which performs the recording and/or reproduction of information for an information recording surface, by making the light flux from the second light source to form an image on an information recording surface of a second optical information recording medium, through a protection base board having base board thickness t2 greater than t1, wherein it is possible to make the optical magnification for the recording or reproduction of information for the second optical information recording medium (for example, CD-R) to be smaller than the optical magnification for the reproduction of information for the first optical information recording medium (for example, DVD-ROM), because the light-convergent optical system can change the optical magnification in accordance with the wavelength of the light source, and thereby to obtain sufficiently the amount of light for the case of performing the recording or the reproduction of information for the second optical information recording medium.

The optical pick-up device mentioned in (2) can obtain more sufficiently the amount of light in the case of performing the recording or reproduction of information for the second optical information recording medium, by making a divergent angle or convergent angle in the case of performing the recording or reproduction of information for the second optical information recording medium (for example, CD-R) to be smaller by using an optical element, than in the case of performing the reproduction of information for the first optical information recording medium (for example, DVD-ROM), for example, because the light-convergent optical system has the optical element which changes the convergent angle or the divergent angle of the light flux entering the objective lens, in accordance with the wavelength of the light source. Incidentally, the divergent angle or the convergent angle in this case includes the case of the angle zero (that is, a parallel light flux).

The optical pick-up device mentioned in (3) can establish the divergent angle or convergent angle optionally, because the optical element is represented by a coupling lens, and can move in the optical axial direction, in accordance with the wavelength of the light source.

In the optical pick-up device mentioned in (4), it is possible to establish the divergent angle or the convergent angle optionally by using diffractive structure, in accordance with the wavelength of the light source, because the optical element is represented by the coupling lens, and has diffractive structure which changes the divergent angle or convergent angle of the light flux entering the objective lens, in accordance with the wavelength of the light source.

The optical pick-up device mentioned in (5) is represented by an optical pick-up device having therein the light source unit in which the first light source having wavelength $\lambda 1$ and the second light source having wavelength $\lambda 2$ longer than the wavelength $\lambda 1$ are arranged on the single base board, and the light-convergent optical system including the objective lens which performs the reproduction of information from the information recording surface, by making the light flux from the first light source to form an image on the information recording surface of the first optical information recording medium, through the protection base board having base board thickness t1, and which performs the recording and/or reproduction of information for the information recording surface, by making the light flux from the second light source to form an image on the information recording surface of the second optical information recording medium, through the protection base board having base board thickness t2 greater than t1, wherein it is possible to obtain more sufficiently the amount of light in the case of performing the recording or reproduction of information for the second optical information recording medium, by making a divergent angle or convergent angle in the case of performing the recording or reproduction of information for the second optical information recording medium (for example, CD-R) to be smaller, than in the case of performing the reproduction of information for the first optical information recording medium (for example, DVD-ROM), for example, because the light fluxes from the first light source and the second light source, being either one of infinite light flux and finite light flux respectively, enter the objective lens under the condition where the convergent angle or the divergent angle are made to be different each other.

The optical pick-up device mentioned in (6) can obtain more sufficiently the amount of light in the case of performing the recording or reproduction of information for the second optical information recording medium, by making a divergent angle or convergent angle in the case of performing the recording or reproduction of information for the second optical information recording medium (for example, CD-R) to be smaller by using an optical element, than in the case of performing the reproduction of information for the first optical information recording medium (for example, DVD-ROM), for example, because the light-convergent optical system has the optical element which changes the convergent angle or the divergent angle of the light flux entering the objective lens, in accordance with the wavelength of the light source. Incidentally, the divergent angle or the convergent angle in this case includes the case of the angle zero (that is, a parallel light flux).

The optical pick-up device mentioned in (7) can establish the divergent angle or convergent angle optionally, because the optical element is represented by the coupling lens, and can move in the optical axial direction, in accordance with the wavelength of the light source.

In the optical pick-up device mentioned in (8), it is possible to establish the divergent angle or the convergent angle optionally by using diffractive structure, in accordance with the wavelength of the light source, because the optical element is represented by the coupling lens, and has diffractive structure which changes the divergent angle or convergent angle of the light flux entering the objective lens, in accordance with the wavelength of the light source.

The optical pick-up device mentioned in (9) is represented by an optical pick-up device having therein the light source unit in which the first light source having wavelength $\lambda 1$ and the second light source having wavelength $\lambda 2$ longer than the wavelength $\lambda 1$ are arranged on the single base board, and the light-convergent optical system including an objective lens which performs the reproduction of information from the information recording surface, by making the light flux from the first light source to form an image on an information recording surface of a first optical information recording medium, through a protection base board having base board thickness t1, and which performs the recording and/or reproduction of information for an information recording surface, by making the light flux from the second light source to form an image on an information recording surface of a second optical information recording medium, through the protection base board having base board thickness t2 greater than t1, wherein it is possible to obtain more sufficiently the amount of light in the case of performing the recording or the reproduction of information for the second optical information recording medium (for example, CD-R), than in the case of performing the reproduction of information for the first optical information recording medium (for example, DVD-ROM), since the divergent angle or the divergent angle of the light flux entering the objective lens from the first light source is smaller than the divergent angle or the convergent angle of the light flux entering the objective lens from the second light source.

The optical pick-up device mentioned in (10) is represented by an optical pick-up device having therein the light source unit in which the first light source having wavelength $\lambda 1$ and the second light source having wavelength $\lambda 2$ longer than the wavelength $\lambda 1$ are arranged on the single base board, and the light-convergent optical system including the objective lens which performs the reproduction of information from the information recording surface, by making the light flux from the first light source to form an image on the information recording surface of the first optical information recording medium, through the protection base board having base board thickness t1, and which performs the recording and/or reproduction of information for the information recording surface, by making the light flux from the second light source to form an image on the information recording surface of a second optical information recording medium, through the protection base board having base board thickness t2 greater than t1, wherein it is possible to obtain more sufficiently the amount of light in the case of performing the recording or the reproduction of information for the first optical information recording medium than in the case of performing the reproduction of information for the second optical information recording medium, since the divergent angle or the convergent angle of the light flux entering the objective lens from the second light source is smaller than the divergent angle or convergent angle of the light flux entering the objective lens from the first light source. From the characteristic of the light source, it is effective when it is needed to obtain the larger amount of the light flux from the first light source.

The optical pick-up device mentioned in (11) is represented by an optical pick-up device having therein the light source unit in which the first light source having wavelength $\lambda 1$ and the second light source having wavelength $\lambda 2$ longer than the wavelength $\lambda 1$ are arranged on the single base board, and the light-convergent optical system including the objective lens which performs the reproduction of information from the information recording surface, by making the light flux from the first light source to form an image on the information recording surface of the first optical information recording medium, through the protection base board having base board thickness t1, and which performs the recording and/or reproduction of information for an information recording surface, by making the light flux from the second light source to form an image on the information recording surface of the second optical information recording medium, through the protection base board having base board thickness t2 greater than t1, wherein it is preferable if the divergent angle or the convergent angle of the light flux entering the objective lens from the first light source is the same as the divergent angle or the convergent angle of the light flux entering the objective lens from the second light source. Because there is a good case, when the divergent angle or the convergent angle of the light flux entering the objective lens from the first light source is the same as the divergent angle or convergent angle of the light flux entering the objective lens from the first light source. Because there is a good case if the divergent angle or convergent angle in each case is the same, when the light amount of the second light source is larger, from the characteristic of the light source.

The optical pick-up device mentioned in (12) can obtain more sufficiently the amount of light in the case of performing the recording or reproduction of information for the second optical information recording medium, by making the divergent angle or convergent angle in the case of performing the recording or reproduction of information for the second optical information recording medium (for example, CD-R) to be smaller by using an optical element, than in the case of performing the reproduction of information for the first optical information recording medium (for example, DVD-ROM), for example, because the light-convergent optical system has the optical element which changes the convergent angle or the divergent angle of the light flux entering the objective lens, in accordance with the wavelength of the light source. Incidentally, the divergent angle or the convergent angle in this case includes the case of the angle zero (that is, a parallel light flux).

The optical pick-up device mentioned in (13) can establish the divergent angle or convergent angle optionally, because the optical element is represented by a coupling lens, and can move in the optical axial direction, in accordance with the wavelength of the light source.

In the optical pick-up device mentioned in (14), it is possible to establish the divergent angle or the convergent angle optionally by using diffractive structure, in accordance with the wavelength of the light source, because the optical element is represented by the coupling lens, and has diffractive structure which changes the divergent angle or convergent angle of the light flux entering the objective lens, in accordance with the wavelength of the light source.

In the optical pick-up device mentioned in (15), it is preferable if both of the light flux entering the objective lens from the first light source and the light flux entering the objective lens from the second light source are convergent finite light fluxes.

In the optical pick-up device mentioned in (16), it is preferable if both of the light flux entering the objective lens from the first light source and the light flux entering the objective lens from the second light source are divergent finite light fluxes.

In the optical pick-up device mentioned in (17), it is preferable if either one of the light flux entering the objective lens from the first light source and the light flux entering the objective lens from the second light source is the convergent finite light flux, and the other light flux is the divergent finite flux.

In the optical pick-up device mentioned in (18), it is preferable if either one of the light flux entering the objective lens from the first light source and the light flux entering the objective lens from the second light source is the convergent finite light flux, and the other light flux is the infinite light flux.

In the optical pick-up device mentioned in (19), it is preferable if either one of the light flux entering the objective lens from the first light source and the light flux entering the objective lens from the second light source is the divergent finite light flux, and the other light flux is the infinite light flux.

The optical pick-up device mentioned in (20) is represented by an optical pick-up device having therein the light source unit in which the first light source having wavelength $\lambda 1$ and the second light source having wavelength $\lambda 2$ longer than the wavelength $\lambda 1$ are arranged on the single base board, and the light-convergent optical system including an objective lens which performs the reproduction of information from the information recording surface, by making the light flux from the first light source to form an image on an information recording surface of a first optical information recording medium, through a protection base board having base board thickness t1, and which performs the recording and/or reproduction of information for an information recording surface, by making the light flux from the second light source to form an image on an information recording surface of a second optical information recording medium, through the protection base board having base board thickness t2 greater than t1, wherein the objective lens focuses the light flux coming from the first light source and the light flux coming from the second light flux onto the nearly same focal point. In this case, in order to make a change of the optical magnification of the light-convergent optical system between the case to use the light flux from the first light source, and the case to use the light flux from the second light source, for example, a design parameter of the optical element which constitutes the light-convergent optical system is to be changed, however even in this case, it is possible to keep the optical characteristic of the light-convergent optical system, by making the focal lengths of the objective lens to be nearly the same, regardless of the wavelength.

In the optical pick-up device mentioned in (21), it is preferable if the objective lens focuses the light flux from the first light source and the light flux from the second light source onto the focal points different by an amount of longitudinal chromatic aberration for the refraction.

The optical pick-up device mentioned in (22) is represented by an optical pick-up device having therein the light source unit in which the first light source having wavelength $\lambda 1$ and the second light source having wavelength $\lambda 2$ longer than the wavelength $\lambda 1$ are arranged on the single base board, and the light-convergent optical system including an objective lens which performs the reproduction of information from the information recording surface, by making the light flux from the first light source to form an image on an information recording surface of a first optical information recording medium, through a protection base board having base board thickness t1, and which performs the recording and/or reproduction of information for an information recording surface, by making the light flux from the second light source to form an image on an information recording surface of a second optical information recording medium, through the protection base board having base board thickness t2 greater than t1, wherein the divergent angle or convergent angle of the light flux entering the objective lens from the second light source is smaller than the divergent angle or convergent angle of the light flux entering the objective lens from the first light source. In this case, in order to make a change of the optical magnification of the light-convergent optical system between the case to use the light flux from the first light source, and the case to use the light flux from the second light source, for example, a design parameter of the optical element which constitutes the light-convergent optical system is to be changed, however even in this case, it is possible to make the focal lengths of the objective lens to be nearly the same, regardless to the wavelengths, by making the divergent angle or the convergent angle of the light flux entering the objective lens from the second light source to be smaller than the divergent angle or the convergent angle of the light flux entering the objective lens from the first light source, and thereby to keep the optical characteristic of the light-convergent optical system.

The optical pick-up device mentioned in (23) can obtain more sufficiently the amount of light in the case of performing the recording or reproduction of information for the second optical information recording medium, by making the divergent angle or convergent angle in the case of performing the recording or reproduction of information for the second optical information recording medium (for example, CD-R) to be smaller by using an optical element, than in the case of performing the reproduction of information for the first optical information recording medium (for example, DVD-ROM), for example, because the light-convergent optical system has the optical element which changes the convergent angle or the divergent angle of the light flux entering the objective lens, in accordance with the wavelength of the light source. Incidentally, the divergent angle or the convergent angle in this case includes the case of the angle zero (that is, a parallel light flux).

The optical pick-up device mentioned in (24) can establish the divergent angle or convergent angle optionally, because the optical element is represented by the coupling lens, and can move in the optical axial direction, in accordance with the wavelength of the light source.

In the optical pick-up device mentioned in (25), it is possible to establish the divergent angle or the convergent angle optionally by using diffractive structure, in accordance with the wavelength of the light source, because the optical element is represented by the coupling lens, and has diffractive structure which changes the divergent angle or convergent angle of the light flux entering the objective lens, in accordance with the wavelength of the light source.

In the optical pick-up device mentioned in (26), it is preferable if both of the light flux entering the objective lens from the first light source and the light flux entering the objective lens from the second light source are divergent finite light fluxes.

In the optical pick-up device mentioned in (27), it is preferable if the light flux entering the objective lens from the first light source is the divergent finite light flux, and the light flux entering the objective lens from the second light source is the infinite light flux.

In the optical pick-up device mentioned in (28), it is preferable if the light flux entering the objective lens from the first light source is the divergent finite light flux, and the light flux entering the objective lens from the second light source is the convergent finite light flux.

In the optical pick-up device mentioned in (29), it is preferable if the light flux entering the objective lens from the first light source is the infinite light flux, and the light flux entering the objective lens from the second light source is the convergent finite light flux.

In the optical pick-up device mentioned in (30), it is preferable if both of the light flux entering the objective lens from the first light source and the light flux entering the objective lens from the second light source are the convergent finite light fluxes.

The optical pick-up device mentioned in (31) is represented by an optical pick-up device having therein the light source unit in which the first light source having wavelength $\lambda 1$ and the second light source having wavelength $\lambda 2$ longer than the wavelength $\lambda 1$ are arranged on the single base board, and the light-convergent optical system which performs the reproduction of information from the information recording surface, by making the light flux from the first light source to form an image on the information recording surface of the first optical information recording medium, through the protection base board having base board thickness t1, and which performs the recording and/or reproduction of information for the information recording surface, by making the light flux from the second light source to form an image on the information recording surface of the second optical information recording medium, through the protection base board having base board thickness t2 greater than t1, wherein the light-convergent optical system is provided with the coupling lens which is fixed at a relative position in the direction to the optical path for the light source unit and changes the divergent angle of the light fluxes from the first light source and second light source, and with the objective lens which focuses the light flux passing through the coupling lens onto the information recording surface of the first or second optical information recording medium, and since there is formed an optical functional area, whose magnification is different between the occasion when the light flux from the first light source passes through and the occasion when the light flux from the second light source passes through, on at least one of the optical surface of the coupling lens and the objective lens, it is possible to obtain more sufficiently the amount of light for the case of performing the recording or reproduction of information for the second optical information recording medium (CD-R), by making a divergent angle or convergent angle in the case of performing the recording or reproduction of information for the second optical information recording medium to be smaller by an optical element using the optical functional area, than in the case of performing the reproduction of information for the first optical information recording medium (for example, DVD-ROM), for example, because the light-convergent optical system has the optical element which changes the convergent angle or the divergent angle of the light flux entering the objective lens, in accordance with the wavelength of the light source.

In the optical pick-up device mentioned in (32), it is possible to obtain more sufficiently the amount of light for the case of performing the recording or reproduction of information for the second optical information recording medium, because the optical functional area changes the divergent angle or convergent angle, in accordance with the wavelength of the light flux passing through.

In the optical pick-up device mentioned in (33), it is possible to make the divergent angle or convergent angle to be smaller in accordance with the wavelength, by using a diffractive effect, because the diffractive structure is provided on the optical functional area.

In the optical pick-up device mentioned in (34), it is possible to obtain sufficiently the amount of light for the case of performing the recording or reproduction of information for the second optical information recording medium, because the magnification of the case that the light flux from the second light source passes through the light-convergent optical system is smaller than the magnification of the case that the light flux from the first light source passes through the light-convergent optical system.

The optical pick-up device mentioned in (35) is represented by an optical pick-up device having therein the light source unit in which the first light source having wavelength $\lambda 1$ and the second light source having wavelength $\lambda 2$ longer than the wavelength $\lambda 1$ are arranged on the single base board, and the light-convergent optical system which performs the reproduction of information from the information recording surface, by making the light flux from the first light source to form an image on the information recording surface of the first optical information recording medium, through the protection base board having base board thickness t1, and which performs the recording and/or reproduction of information for the information recording surface, by making the light flux from the second light source to form an image on the information recording surface of the second optical information recording medium, through the protection base board having base board thickness t2 greater than t1, wherein the light-convergent optical system is provided with the coupling lens which is fixed at a relative position in the direction to the optical path for the light source unit and changes the divergent angle of the light fluxes from the first light source and second light source, and with the objective lens which focuses the light flux passing through the coupling lens onto the information recording surface of the first or second optical information recording medium, and since there is formed an optical functional area which makes the focal length for the light flux from the second light source passing through to be shorter than the focal length for the light flux from the first light source passing through, on at least one of the optical surface of the coupling lens, it is possible to obtain more sufficiently the amount of light for the case of performing the recording or reproduction of information for the second optical information recording medium, when the recording or reproduction of information for the second optical information recording medium (for example, CD-R), by making the divergent angle or convergent angle to be smaller by using the optical functional area, than in the case of performing the reproduction of information for the first optical information recording medium (for example, DVD-ROM).

In the optical pick-up device mentioned in (36), it is possible to obtain more sufficiently the amount of light for the case of performing the recording or reproduction of information for the second optical information recording medium, because the optical functional area changes the divergent angle or convergent angle, in accordance with the wavelength of the light flux passing through.

In the optical pick-up device mentioned in (37), it is possible to make the divergent angle or convergent angle to be smaller in accordance with the wavelength, by using a diffractive effect, because the diffractive structure is provided on the optical functional area.

In the optical pick-up device mentioned in (38), it is possible to obtain sufficiently the amount of light for the case of performing the recording or reproduction of information for the second optical information recording medium, because the magnification of the case that the light flux from the second light source passes through the light-convergent optical system is smaller than the magnification of the case that the light flux from the first light source passes through the light-convergent optical system.

The optical pick-up device mentioned in (39) is represented by an optical pick-up device having therein the light source unit in which the first light source having wavelength $\lambda 1$ and the second light source having wavelength $\lambda 2$ longer than the wavelength $\lambda 1$ are arranged on the single base board, and the light-convergent optical system which performs the reproduction of information from the information recording surface, by making the light flux from the first light source to form an image on the information recording surface of the first optical information recording medium, through the protection base board having base board thickness t1, and which performs the recording and/or reproduction of information for the information recording surface, by making the light flux from the second light source to form an image on the information recording surface of the second optical information recording medium, through the protection base board having base board thickness t2 greater than t1, wherein the light-convergent optical system is provided with the coupling lens which is fixed at a relative position in the direction to the optical path for the light source unit and changes the divergent angle of the light fluxes from the first light source and second light source, and with the objective lens which focuses the light flux passing through the coupling lens onto the information recording surface of the first or second optical information recording medium, and since there is formed an optical functional area which makes the focal length for the light flux from the second light source passing through to be shorter than the focal length for the light flux from the first light source passing through, on at least one of the optical surface of the objective lens, it is possible to obtain more sufficiently the amount of light for the case of performing the recording or reproduction of information for the second optical information recording medium, when the recording or reproduction of information for the second optical information recording medium (for example, CD-R), by making the divergent angle or convergent angle to be smaller by using the optical functional area, than in the case of performing the reproduction of information for the first optical information recording medium (for example, DVD-ROM).

In the optical pick-up device mentioned in (40), it is possible to make the divergent angle or convergent angle to be smaller in accordance with the wavelength, by using a diffractive effect, because the diffractive structure is provided on the optical functional area.

In the optical pick-up device mentioned (41), when a non-diffractive objective lens having the same refractive interface as that of the objective lens and not having the diffractive structure is used for a comparative example, it is possible to make the divergent angle or convergent angle to be smaller, by making use of the diffractive effect of the diffractive structure in the objective lens, since the difference between the focal length for the light flux of a first wavelength passing through the objective lens having the diffractive structure and the focal length for the light flux of a second wavelength passing through the objective lens having the diffractive structure is greater than the difference between the focal length for the light flux of the first wavelength passing through the non-diffractive objective lens and the focal length for the light flux of the second wavelength passing through the non-diffractive objective lens.

In the optical pick-up device mentioned in (42), when the focal length in the case that the light flux of the second wavelength passes through the objective lens is longer than the length representing the sum of the focal length in the case that the light flux of the first wavelength passes through the objective lens and the amount of longitudinal chromatic aberration for the refraction, it is possible to change the focal length, exceeding the change of the focal length generated in accordance with the change of the wavelength.

In the optical pick-up device mentioned in (43), the sufficient effect is expectable, if the focal length in the case that the light flux from the first light source passes through is 120% longer than the focal length in the case that the light flux from the second light source passes through.

In the optical pick-up device mentioned in (44), when the recording of information is performed for the first optical information recording medium, it is also possible to apply to those other than the so called combo drive, which is preferable.

The objective lens of the optical pick-up device mentioned in (45) is represented by an objective lens of an optical pick-up device having therein the light source unit in which the first light source having wavelength λ1 and the second light source having wavelength λ2 longer than the wavelength λ1 are arranged on the single base board, and the light-convergent optical system which performs the reproduction of information on the information recording surface, by making the light flux from the first light source on the information recording surface of the first optical information recording medium, through the protection base board having base board thickness t1, or which performs the recording and/or reproduction of information on the information recording surface, by making the light flux from the second light source on the information recording surface of the second optical information recording medium, through the protection base board having base board thickness t2 thicker than t1, wherein the light-convergent optical system can change the optical magnification in accordance with the wavelength of the light source. The action and effect of the present invention are the same as those of the invention mentioned in (1).

The objective lens of the optical pick-up device mentioned in (46) is characterized in that the light-convergent optical system is provided with the optical element which changes the divergent angle or convergent angle of the light flux entering the objective lens, in accordance with the wavelength of the light source. The action and effect of the present invention are the same as those of invention mentioned in (2).

The objective lens of the optical pick-up device mentioned in (47) is characterized in that the optical element is represented by the coupling lens, and is movable in the optical axial direction, in accordance with the wavelength of the light source. The action and effect of the present invention are the same as those of invention mentioned in (3).

The objective lens of the optical pick-up device mentioned in (48) is characterized in that the optical element is represented by the coupling lens, and has the diffractive structure which changes the divergent angle or convergent angle of the light flux entering the objective lens, in accordance with the wavelength of the light source. The action and effect of the present invention are the same as those of invention mentioned in (4).

The objective lens of the optical pick-up device mentioned in (49) is represented by an objective lens of an optical pick-up device having therein the light source unit in which the first light source having wavelength λ1 and the second light source having wavelength λ2 longer than the wavelength λ1 are arranged on the single base board, and the light-convergent optical system including the objective lens which performs the reproduction of information from the information recording surface, by making the light flux from the first light source to form an image on the information recording surface of the first optical information recording medium, through the protection base board having base board thickness t1, and which performs the recording and/or reproduction of information for the information recording surface, by making the light flux from the second light source to form an image on the information recording surface of the second optical information recording medium, through the protection base board having base board thickness t2 greater than t1, wherein the light fluxes from the first light source and the second light source, being either one of infinite light flux and finite light flux respectively, enter the objective lens under the condition where the convergent angle or the divergent angle are made to be different each other. The action and effect of the present invention are the same as those of invention mentioned in (5).

The objective lens of the optical pick-up device mentioned in (50) is characterized in that the light-convergent optical system is provided with the optical element which changes the divergent angle or convergent angle entering the objective lens in accordance with the wavelength of the light source. The action and effect of the present invention are the same as those of invention mentioned in The objective lens of the optical pick-up device mentioned in (51) is characterized in that the optical element is represented by the coupling lens, and is movable in the optical axial direction in accordance with the wavelength of the light source. The action and effect of the present invention are the same as those of invention mentioned in (7).

The objective lens of the optical pick-up device mentioned in (52) is characterized in that the optical element is represented by the coupling lens, and has the diffractive structure which changes the convergent angle or divergent angle of the light flux entering the objective lens, in accordance with the wavelength of the light source. The action and effect of the present invention are the same as those of invention mentioned in (8).

The objective lens of the optical pick-up device mentioned in (53) is represented by an objective lens of an optical pick-up device having therein the light source unit in which the first light source having wavelength $\lambda 1$ and the second light source having wavelength $\lambda 2$ longer than the wavelength $\lambda 1$ are arranged on the single base board, and the light-convergent optical system including the objective lens which performs the reproduction of information from the information recording surface, by making the light flux from the first light source to form an image on the information recording surface of the first optical information recording medium, through the protection base board having base board thickness t1, and which performs the recording and/or reproduction of information for the information recording surface, by making the light flux from the second light source to form an image on the information recording surface of the second optical information recording medium through, the protection base board having base board thickness t2 greater than t1, wherein the divergent angle or convergent angle of the light flux entering the objective lens from the first light source is smaller than that from the second light source. The action and effect of the present invention are the same as those of invention mentioned in (9).

The objective lens of the optical pick-up device mentioned in (54) is represented by an objective lens of an optical pick-up device having therein the light source unit in which the first light source having wavelength $\lambda 1$ and the second light source having wavelength $\lambda 2$ longer than the wavelength $\lambda 1$ are arranged on the single base board, and the light-convergent optical system including an objective lens which performs the reproduction of information from the information recording surface, by making the light flux from the first light source to form an image on an information recording surface of a first optical information recording medium, through a protection base board having base board thickness t1, and which performs the recording and/or reproduction of information for an information recording surface, by making the light flux from the second light source to form an image on an information recording surface of a second optical information recording medium, through the protection base board having base board thickness t2 greater than t1, wherein the divergent angle or the convergent angle of the light flux entering the objective lens from the second light source is smaller than the divergent angle or the convergent angle of the light flux entering the objective lens from the first light source. The action and effect of the present invention are the same as those of invention mentioned in (10).

The objective lens of the optical pick-up device mentioned in (55) is represented by an objective lens of an optical pick-up device having therein the light source unit in which the first light source having wavelength $\lambda 1$ and the second light source having wavelength $\lambda 2$ longer than the wavelength $\lambda 1$ are arranged on the single base board, and the light-convergent optical system including the objective lens which performs the reproduction of information from the information recording surface, by making the light flux from the first light source to form an image on the information recording surface of the first optical information recording medium, through the protection base board having base board thickness t1, and which performs the recording and/or reproduction of information for an information recording surface, by making the light flux from the second light source to form an image on the information recording surface of the second optical information recording medium, through the protection base board having base board thickness t2 greater than t1, wherein the divergent angle or convergent angle of the light flux entering the objective lens from the first light source is the same as the divergent angle or the convergent angle of the light flux entering the objective lens from the second light source. The action and effect of the present invention are the same as those of invention mentioned in (11).

The objective lens of the optical pick-up device mentioned in (56) is characterized in that the light-convergent optical system is provided with the optical element which changes the convergent angle or divergent angle entering the objective lens, in accordance with the wavelength of the light source. The action and effect of the present invention are the same as those of invention mentioned in (12).

The objective lens of the optical pick-up device mentioned in (57) is characterized in that the optical element is represented by the coupling lens, and movable in the optical axial direction, in accordance with the wavelength of the light source. The action and effect of the present invention are the same as those of invention mentioned in (13).

The objective lens of the optical pick-up device mentioned in (58) is characterized in that the optical element is represented by the coupling lens, and has the diffractive structure which changes the divergent angle or convergent angle of the light flux entering the objective lens, in accordance with the wavelength of the light source. The action and effect of the present invention are the same as those of invention mentioned in (14).

The objective lens of the optical pick-up device mentioned in (59) is characterized in that both of the light flux entering the objective lens from the first light source and the light flux entering the objective lens from the second light source are the convergent finite light fluxes.

The objective lens of the optical pick-up device mentioned in (60) is characterized in that both of the light flux entering the objective lens from the first light source and the light flux entering the objective lens from the second light source are the divergent finite light fluxes.

The objective lens of the optical pick-up device mentioned in (61) is characterized in that either one of the light flux entering the objective lens from the first light source and the light flux entering the objective lens from the second light source is the convergent finite light flux, and the other light flux is the divergent finite flux.

The objective lens of the optical pick-up device mentioned in (62) is characterized in that either one of the light flux entering the objective lens from the first light source and the light flux entering the objective lens from the second light source is the convergent finite light flux, and the other light flux is the infinite light flux.

The objective lens of the optical pick-up device mentioned in (63) is characterized in that either one of the light flux entering the objective lens from the first light source and the light flux entering the objective lens from the second light source is the divergent finite light flux, and the other light flux is the infinite light flux.

The objective lens of the optical pick-up device mentioned in (64) is represented by an objective lens of an optical pick-up device having therein the light source unit in which the first light source having wavelength $\lambda 1$ and the second light source having wavelength $\lambda 2$ longer than the wavelength $\lambda 1$ are arranged on the single base board, and the light-convergent optical system including an objective lens which performs the reproduction of information from the information recording surface, by making the light flux from the first light source to form an image on an information recording surface of a first optical information recording medium, through a protection base board having base board thickness t1, and which performs the recording and/or reproduction of information for an information recording surface, by making the light flux from the second light source to form an image on an information recording surface of a second optical information recording medium, through the protection base board having base board thickness t2 greater than t1, wherein the objective lens focuses the light flux coming from the first light source and the light flux coming from the second light flux onto the nearly same focal point. The action and effect of the present invention are the same as those of invention mentioned in (20).

The objective lens of the optical pick-up device mentioned in (65) is characterized in that the objective lens focuses the light flux from the first light source and the light flux from the second light source onto the focal points different by an amount of longitudinal chromatic aberration for the refraction. The action and effect of the present invention are the same as those of invention mentioned in (21).

The objective lens of the optical pick-up device mentioned in (66) is represented by an objective lens of an optical pick-up device having therein the light source unit in which the first light source having wavelength $\lambda 1$ and the second light source having wavelength $\lambda 2$ longer than the wavelength $\lambda 1$ are arranged on the single base board, and the light-convergent optical system including an objective lens which performs the reproduction of information from the information recording surface, by making the light flux from the first light source to form an image on an information recording surface of a first optical information recording medium, through a protection base board having base board thickness t1, and which performs the recording and/or reproduction of information for an information recording surface, by making the light flux from the second light source to form an image on an information recording surface of a second optical information recording medium, through the protection base board having base board thickness t2 greater than t1, wherein the convergent angle or divergent angle of the light flux entering the objective lens from the second light source is smaller than the convergent angle or divergent angle of the light flux entering the objective lens from the first light source. The action and effect of the present invention are the same as those of invention mentioned in (22).

The objective lens of the optical pick-up device mentioned in (67) is characterized in that the light-convergent optical system has the optical element which changes the convergent angle or the divergent angle of the light flux entering the objective lens, in accordance with the wavelength of the light source. The action and effect of the present invention are the same as those of invention mentioned in (23).

The objective lens of the optical pick-up device mentioned in (68) is characterized in that the optical element is represented by the coupling lens, and is movable in the optical axial direction, in accordance with the wavelength of the light source. The action and effect of the present invention are the same as those of invention mentioned in (24).

The objective lens of the optical pick-up device mentioned in (69) is characterized in that the optical element is represented by the coupling lens, and is provided with the diffractive structure which changes the divergent angle or convergent angle of the light flux entering the objective lens, in accordance with the wavelength of the light source. The action and effect of the present invention are the same as those of invention mentioned in (25).

The objective lens of the optical pick-up device mentioned in (70) is characterized in that both of the light flux entering the objective lens from the first light source and the light flux entering the objective lens from the second light source are the divergent finite light fluxes.

The objective lens of the optical pick-up device mentioned in (71) is characterized in that the light flux entering the objective lens from the first light source is the divergent finite light flux, and the light flux entering the objective lens from the second light source is the infinite light flux.

The objective lens of the optical pick-up device mentioned in (72) is characterized in that the light flux entering the objective lens from the first light source is the divergent finite light flux, and the light flux entering the objective lens from the second light source is the convergent finite light flux.

The objective lens of the optical pick-up device mentioned in (73) is characterized in that the light flux entering the objective lens from the first light source is the infinite light flux, and the light flux entering the objective lens from the second light source is the convergent finite light flux.

The objective lens of the optical pick-up device mentioned in (74) is characterized in that both of the light flux entering the objective lens from the first light source and the light flux entering the objective lens from the second light source are the convergent finite light fluxes.

The objective lens of the optical pick-up device mentioned in (75) is represented by an objective lens of an optical pick-up device having therein the light source unit in which the first light source having wavelength $\lambda 1$ and the second light source having wavelength $\lambda 2$ longer than the wavelength $\lambda 1$ are arranged on the single base board, and the light-convergent optical system which performs the reproduction of information from the information recording surface, by making the light flux from the first light source to form an image on the information recording surface of the first optical information recording medium, through the protection base board having base board thickness t1, and which performs the recording and/or reproduction of information for the information recording surface, by making the light flux from the second light source to form an image on the information recording surface of the second optical information recording medium, through the protection base board having base board thickness t2 greater than t1, wherein the light-convergent optical system is provided with the coupling lens which is fixed at a relative position in the direction to the optical path for the light source unit and changes the divergent angle of the light fluxes from the first light source and second light source, and with the objective lens which focuses the light flux passing through the coupling lens onto the information recording surface of the first or second optical information recording medium, and there is formed the optical functional area, whose magnification is different between the occasion when the light flux from the first light source passes through and the occasion when the light flux from the second light source passes through, on at least one of the optical surface of the coupling lens and the objective lens. The action and effect of the present invention are the same as those of invention mentioned in (31).

The objective lens of the optical pick-up device mentioned in (76) is characterized in that the optical functional area changes the divergent angle or convergent angle, in accordance with the wavelength of the light flux passing through. The action and effect of the present invention are the same as those of invention mentioned in (32).

The objective lens of the optical pick-up device mentioned in (77) is characterized in that the diffractive structure is provided on the optical functional area. The action and effect of the present invention are the same as those of invention mentioned in (33).

The objective lens of the optical pick-up device mentioned in (78) is characterized in that the magnification of the case that the light flux from the second light source passes through the light-convergent optical system is smaller than the magnification of the case that the light flux from the first light source passes through the light-convergent optical system. The action and effect of the present invention are the same as those of invention mentioned in (34).

The objective lens of the optical pick-up device mentioned in (79) is represented by an objective lens of an optical pick-up device having therein the light source unit in which the first light source having wavelength $\lambda 1$ and the second light source having wavelength $\lambda 2$ longer than the wavelength $\lambda 1$ are arranged on the single base board, and the light-convergent optical system which performs the reproduction of information from the information recording surface, by making the light flux from the first light source to form an image on the information recording surface of the first optical information recording medium, through the protection base board having base board thickness t1, and which performs the recording and/or reproduction of information for the information recording surface, by making the light flux from the second light source to form an image on the information recording surface of the second optical information recording medium, through the protection base board having base board thickness t2 greater than t1, wherein the light-convergent optical system is provided with the coupling lens which is fixed at a relative position in the direction to the optical path for the light source unit and changes the divergent angle of the light fluxes from the first light source and second light source, and with the objective lens which focuses the light flux passing through the coupling lens onto the information recording surface of the first or second optical information recording medium, and there is formed an optical functional area which makes the focal length for the light flux from the second light source passing through to be shorter than the focal length for the light flux from the first light source passing through, on at least one of the optical surface of the coupling lens. The action and effect of the present invention are the same as those of invention mentioned in (35).

The objective lens of the optical pick-up device mentioned in (80) is characterized in that the optical functional area changes the divergent angle or convergent angle, in accordance with the wavelength of the light flux passing through. The action and effect of the present invention are the same as those of invention mentioned in (36).

The objective lens of the optical pick-up device mentioned in (81) is characterized in that the diffractive structure is provided on the optical functional area. The action and effect of the present invention are the same as those of invention mentioned in (37).

The objective lens of the optical pick-up device mentioned in (82) is characterized in that the magnification of the case that the light flux from the second light source passes through the light-convergent optical system is smaller than the magnification of the case that the light flux from the first light source passes through the light-convergent optical system. The action and effect of the present invention are the same as those of invention mentioned in (38).

The objective lens of the optical pick-up device mentioned in (83) is represented by an objective lens of an optical pick-up device having therein the light source unit in which the first light source having wavelength $\lambda 1$ and the second light source having wavelength $\lambda 2$ longer than the wavelength $\lambda 1$ are arranged on the single base board, and the light-convergent optical system which performs the reproduction of information from the information recording surface, by making the light flux from the first light source to form an image on the information recording surface of the first optical information recording medium, through the protection base board having base board thickness t1, and which performs the recording and/or reproduction of information for the information recording surface, by making the light flux from the second light source to form an image on the information recording surface of the second optical information recording medium through the protection base board having base board thickness t2 greater than t1, wherein the light-convergent optical system is provided with the coupling lens which is fixed at a relative position in the direction to the optical path for the light source unit and changes the divergent angle of the light fluxes from the first light source and second light source, and with the objective lens which focuses the light flux passing through the coupling lens onto the information recording surface of the first or second optical information recording medium, and there is formed an optical functional area which makes the focal length for the light flux from the second light source passing through to be shorter than the focal length for the light flux from the first light source passing through, on at least one of the optical surface of the objective lens. The action and effect of the present invention are the same as those of invention mentioned in (39).

The objective lens of the optical pick-up device mentioned in (84) is characterized in that the diffractive structure is provided on the optical functional area. The action and effect of the present invention are the same as those of invention mentioned in (40).

The objective lens of the optical pick-up device mentioned (85) is characterized in that, when a non-diffractive objective lens having the same refractive interface as that of the objective lens and not having the diffractive structure is used for a comparative example, the difference between the focal length for the light flux of a first wavelength passing through the objective lens having the diffractive structure and the focal length for the light flux of a second wavelength passing through the objective lens having the diffractive structure is greater than the difference between the focal length for the light flux of the first wavelength passing through the non-diffractive objective lens and the focal length for the light flux of the second wavelength passing through the non-diffractive objective lens. The action and effect of the present invention are the same as those of invention mentioned in (41).

The objective lens of the optical pick-up device mentioned in (86) is characterized in that the focal length in the case that the light flux of the second wavelength passes through the objective lens is longer than the length representing the sum of the focal length in the case that the light flux of the first wavelength passes through the objective lens and the amount of longitudinal chromatic aberration for the refraction. The action and effect of the present invention are the same as those of invention mentioned in (42).

The objective lens of the optical pick-up device mentioned in (87) is characterized in that the focal length in the case that the light flux from the first light source passes through is 120% longer than the focal length in the case that the light flux from the second light source passes through. The action and effect of the present invention are the same as those of invention mentioned in (43).

The objective lens of the optical pick-up device mentioned in (88) is characterized in that the recording of information is performed for the first optical information recording medium. The action and effect of the present invention are the same as those of the invention mentioned in (44).

"The diffractive structure" used in the present specification means the section which is provided with relief on the surface of the objective lens and has the function to converge or diverge the light flux by diffraction. Concerning a form of the relief, there is known the shape wherein ring-shaped zones are formed on the surface of the objective lens to be the concentric circles around the optical axis representing the center, and when its section on a plane including an optical axis is viewed, each ring-shaped zone is like a saw-tooth. The form of the relief includes above-mentioned shape, and this shape is named "the diffractive ring-shaped zone" especially.

In this specification, the objective lens means, in a narrow sense, a lens having a convergent function, being arranged to face the optical information recording medium at the nearest position to the optical information recording medium, under the condition where the optical information recording medium is installed in the optical pick-up device, while it means, in a wide sense, a lens which can be moved together with the lens at least in the optical axial direction by an actuator. Accordingly, in this specification, numerical aperture NA of the optical information recording medium side (image side) of the objective lens means numerical aperture NA of the lens surface of the objective lens closest to the optical information recording medium. Further, in this specification, it is assumed that the necessary numerical aperture NA means the numerical aperture which is stipulated by the specification of each optical information recording medium, or means the numerical aperture of the objective lens having diffraction limit power which can obtain a spot diameter necessary for the recording or reproduction of information, in accordance with the wavelength of the light source in use.

In this specification, the second optical information recording media means, for example, the optical disks of the various CD systems such as CD-R, CD-RW, CD-Video and CD-ROM, while the first optical information recording media include the optical disks of the various DVD systems which are not only DVD-ROM and DVD-Video for performing the reproduction exclusively, but also DVD-RAM, DVD-R and DVD-RW for performing the reproduction and recording. Further, in this specification, the thickness t of the transparent base board includes the case of t=0.

BRIEF DESCRIPTION OF THE DRAWINGS

FIG. 5($a$) is a diagram of an optical path at the time of using DVD, and FIG. 6($b$) is a diagram of an optical path at the time of using CD in Example 5.

DETAILED DESCRIPTION OF THE EMBODIMENT

Figure 1:
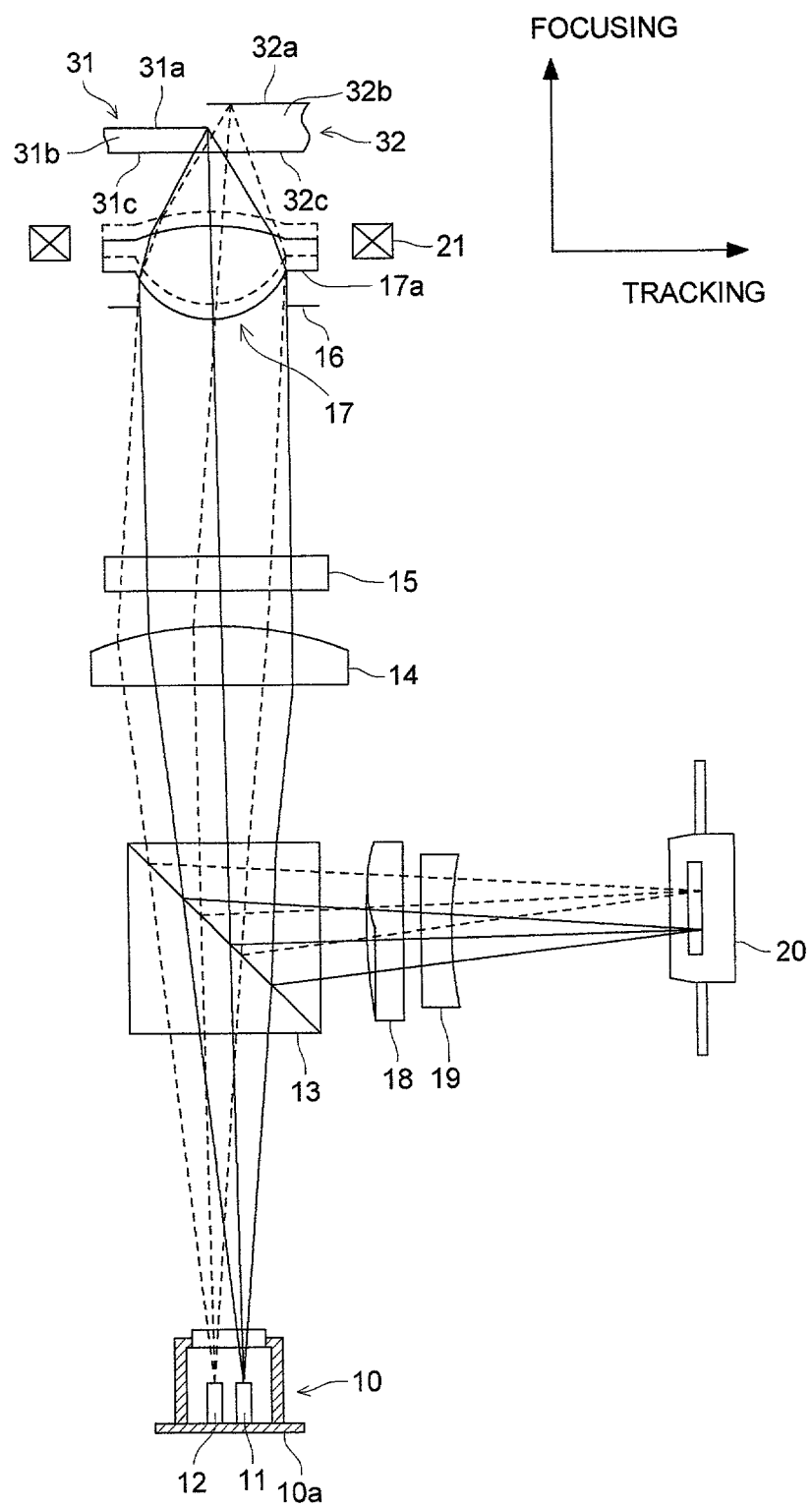
FIG. 1 is a schematic structure of the optical pick-up device showing the embodiment of the invention.

The embodiments of the invention will be explained below, referring to the drawings. The first embodiment of the invention will be explained below, referring to the drawing. FIG. 1 is an optical path drawing showing a schematic structure of the optical pick-up device showing the embodiment of the invention. In the following examples, though CD and DVD are shown for the examples of the optical information recording media, it is naturally possible to use the media other than the above-mentioned media.

The optical pickup device shown in FIG. 1 is structured so that recording and/or reproduction of information may be conducted by each of light fluxes being emitted respectively from the first and the second light sources and having wavelength respectively of 655 nm and 785 nm, on each of information recording surfaces 31$a$ and 32$a$ respectively of the first optical disk 31 and the second optical disk 32, concerning both of DVD (first optical disk 31) having 0.6 mm-thick protecting base board 31$b$ and CD (second optical disk 32) having 1.2 mm-thick protecting base board 32$b$.

As shown in FIG. 1, the optical pickup device is provided with first semiconductor laser (first light source) 11 that emits a light flux having a wavelength of 655 nm for DVD as shown by solid lines in the figure, second semiconductor laser (second light source) 12 that emits light having a wavelength of 785 nm for CD as shown by broken lines in the figure, coupling lens 14 that makes each of light fluxes emitted from light sources 11 and 12 almost parallel to be infinite light through refracting actions, and objective lens 17 that makes the infinite light emerging from the coupling lens 14 to form an image on each of information recording surfaces 31$a$ and 32$a$ respectively of the optical disks 31 and 32.

This wavelength-selectivity of the coupling lens 14 can be attained either by forming a prescribed diffractive structure or by a simple aspherical refracting interface. Namely, it is possible to make an emerging light flux to be a finite light or an infinite light, depending on the wavelength of the incident light flux, or, it is possible to make the finite light to be a convergent light or a divergent light. It is further possible to make them to represent an infinite light, as in the present example.

The first semiconductor laser 11 and the second semiconductor laser 12 are arranged on the same base board 10$a$ to be united solidly as light source unit 10. Therefore, the distance from a light-emitting point of the first semiconductor laser 11 to the surface of the first optical disk 31 is mostly the same as that from a light-emitting point of the second semiconductor laser 12 to the surface of the second optical disk 32.

Further, between coupling lens 14 and light sources 11 and 12, there is arranged beam splitter 13 through which the light fluxes emitted respectively from light sources 11 and 12 pass, and between the coupling lens 14 and objective lens 17, there are arranged ¼ wavelength plate 15 and diaphragm 16. It is further structured so that a light flux reflected on each of information recording surfaces 31a and 32a respectively of optical disks 31 and 32 changes its optical path in the beam splitter 13 to advance to optical detector 20.

The objective lens 17 has, on its peripheral surface, flange section 17a which makes it possible to mount the objective lens 17 easily on the optical pickup device. Since the flange section 17a has a surface extending in the direction perpendicular to an optical axis of the objective lens 17, it is possible to mount easily the objective lens more accurately. The objective lens 17 is driven by two-axle actuator 21 both in the focusing direction and the tracking direction.

On the optical surface of the objective lens 17, there is formed a ring-shaped diffractive structure which changes a focal length of an objective lens to be longer when a wavelength of an incident light flux is longer. Further, on the central area which includes an optical axis of the objective lens 17 and is used for recording and/or reproduction of information for both the first optical disk 31 and the second optical disk 32, there is formed a ring-shaped diffractive structure for correction of spherical aberration which corrects spherical aberration caused by a difference between thickness of protecting base boards 31b and 32b respectively of optical disks 31 and 32.

When reproducing the first optical disk (DVD) 31, a light flux which has emerged from the first semiconductor laser 11 as shown by solid lines in the figure passes through beam splitter 13 and passes through coupling lens 14 to become a parallel light flux. This parallel light flux passes through ¼ wavelength plate 15 and diaphragm 16, and is converged on information recording surface 31a by objective lens 17 through protecting base board 31b of the first optical disk 31. Then, the light flux modulated by information bit and reflected on information recording surface 31a passes again through objective lens 17, diaphragm 16, ¼ wavelength plate 15 and coupling lens 14, and is reflected by beam splitter 13, then, is given astigmatism by cylindrical lens 18, and passes through concave lens 19 to enter photodetector 20, thus, signals by reading information recorded on the first optical disk 31 are obtained by the use of signals outputted from the photodetector 20. Further, focusing detection and tracking detection are conducted by detecting a change in amount of light caused by a change in a shape of a spot on photodetector 20 and by a change in position, and based on this detection, two-axle actuator 21 moves the objective lens 17 in the focusing direction so that a light flux from the first semiconductor laser 11 may form an image on information recording surface 31a of the first optical disk 31, and moves the objective lens 17 in the tracking direction so that a light flux from the first semiconductor laser 11 may form an image on a prescribed track. Incidentally, recording of information can be conducted in the same way as in the first optical disk 31.

Next, when reproducing the second optical disk (CD) 32, a light flux which has emerged from the second semiconductor laser 12 as shown by broken lines in the figure passes through beam splitter 13 and passes through coupling lens 14 to become a parallel light flux. This parallel light flux passes through ¼ wavelength plate 15 and diaphragm 16, and is converged on information recording surface 32a by objective lens 17 through protecting base board 32b of the second optical disk 32. Then, the light flux modulated by information bit and reflected on information recording surface 32a passes again through objective lens 17, diaphragm 16, ¼ wavelength plate 15 and coupling lens 14, and is reflected by beam splitter 13, then, is given astigmatism by cylindrical lens 18, and passes through concave lens 19 to enter photodetector 20, thus, signals by reading information recorded on the second optical disk 32 are obtained by the use of signals outputted from the photodetector 20. Further, focusing detection and tracking detection are conducted by detecting a change in amount of light caused by a change in a shape of a spot on photodetector 20 and by a change in position, and based on this detection, two-axle actuator 21 moves the objective lens 17 in the focusing direction so that a light flux from the second semiconductor laser 12 may form an image on information recording surface 32a of the second optical disk 32, and moves the objective lens 17 in the tracking direction so that a light flux from the second semiconductor laser 12 may form an image on a prescribed track. Incidentally, recording of information can be conducted in the same way as in the second optical disk 32.

On the optical surface of the objective lens 17, there is formed a diffractive structure which changes a focal length of an objective lens to be longer when a wavelength of an incident light flux is longer, in the case of reproduction and recording on the second optical disk 32 mentioned above. Therefore, when the light flux from the second semiconductor laser 112 having a longer wavelength enters the objective lens, the focal length grows greater, and when that light flux is made by two-axle actuator 21 to form an image on information recording surface 32a of the optical disk 32, the distance (working distance) between the objective lens 17 and surface 32c of the second optical disk 32 becomes longer, and a position of the surface 32c of the second optical disk 32 becomes almost the same as that of the surface 31c of the first optical disk 31 for reproduction. It is therefore possible to ensure a sufficient working distance even in the case of reproduction and recording for the second optical disk 32 having a thick protecting base board, which is preferable. In addition, probability of contact between the objective lens 17 and the surface 32c of the second optical disk 32 is lowered, and reliability for reproduction and recording can be improved.

In the present example, as stated above, by using a light source unit in which two light sources each having a different wavelength are formed on the same base board, it is possible to make an optical pickup device to be of a simple structure, and to ensure a sufficient working distance when conducting reproduction and recording for an optical information recording medium having a thick protecting base board with a light flux having a long wavelength, even if the light source unit mentioned above is used, resulting in realization of a highly reliable optical pickup device.

Incidentally, though a diffractive structure formed on the objective lens makes a focal length to be long when conducting reproduction and recording for the second optical disk 32 in this example, this diffractive structure having the aforesaid function may also be provided either on coupling lens 24 or on both of the coupling lens 24 and the objective lens 17.

There will be shown below the data of the present example to which, however, the invention is not limited. In the present example, the first optical information recording medium is DVD (standard wavelength is 655 nm) and the second optical information recording medium is CD (standard wavelength is 785 nm).

The invention can naturally be applied also to the optical information recording medium employing the so-called blue laser light source which has been put to practical use recently.

Namely, the technology of the invention can also be applied sufficiently to the occasion wherein the first optical disk corresponding to a light source with a wavelength of about 405 nm representing the first light source with a short wavelength is assumed to be the first optical disk with t=0.1 mm, and the second optical disk having a long wavelength and a thick protecting base board is used as DVD or CD.

Incidentally, when an optical surface of the objective lens or the coupling lens in the present example is structured to be an aspheric surface, each aspheric surface has an aspherical shape expressed by the following expression Numeral 1. In the expression, Z represents an axis in the direction of an optical axis, h represents an axis that is perpendicular to the optical axis, r represents a paraxial radius of curvature, κ represents the constant of the cone and A represents an aspherical coefficient.

$$Z = \frac{h^2/r}{1+\sqrt{1-(1+\kappa)(h/r)^2}} + \sum_{i=0}^{\infty} A_{2i}h^{2i} \qquad \text{Numeral 1}$$

The diffractive structure formed on the coupling lens or on the objective lens is expressed by the following expression Numeral 2 wherein optical path difference function $\Phi_B$ is used generally and a unit is represented by mm.

$$\Phi_B = \sum_{i=0}^{\infty} B2i h^{2i} \qquad \text{Numeral 2}$$

EXAMPLE

In the Example 1, infinite light enters an objective lens from a coupling lens for both of DVD and CD, and FIG. 3(a) shows an optical path diagram for DVD, while, FIG. 3(b) shows an optical path diagram for CD. Table 1 shows lens data of the Example 1.

TABLE 1

| | $f_1$ = 3.05 mm NA1: 0.60 | | $f_2$ = 3.13 mm NA2: 0.47 | |
|---|---|---|---|---|
| i-th surface | ri | di (655 nm) | ni (655 nm) | di (785 nm) | ni (785 nm) |
| 0 | | 17.3915 | | 17.3915 | |
| 1 | 75.24069 | 1.60000 | 1.54094 | 1.60000 | 1.53716 |
| 2 | −11.31389 | 6.00000 | 1.0 | 6.29930 | 1.0 |
| 3 | 1.74939 | 1.52000 | 1.54094 | 1.52000 | 1.53716 |
| 3' | 2.01776 | 1.50295 | 1.54094 | 1.50295 | 1.53716 |
| 4 | −7.78209 | 1.83584 | 1.0 | 1.53648 | 1.0 |
| 5 | ∞ | 0.6 | 1.57752 | 1.2 | 1.57063 |
| 6 | ∞ | | | | |

Aspheric Surface Data

Second Surface Aspheric Surface Coefficient

| κ | −7.4034×E−1 | | |
|---|---|---|---|
| A1 | +6.7420×E−6 | P1 | 4.0 |
| A2 | +9.6371×E−8 | P2 | 6.0 |

Third (3rd) surface (0<h<1.472 mm: DVD/CD jointly owned area)

Aspheric Surface Coefficient

| κ | −1.9467×E−1 | | |
|---|---|---|---|
| A1 | +2.8798×E−2 | P1 | 4.0 |
| A2 | −1.6897×E−3 | P2 | 6.0 |
| A3 | −1.7500×E−4 | P3 | 8.0 |
| A4 | +8.4566×E−5 | P4 | 10.0 |
| A5 | −5.7230×E−6 | P5 | 12.0 |
| A6 | −3.1154×E−6 | P6 | 14.0 |

Optical path difference function (Coefficient of optical path difference function: Standard wavelength 720 nm)

C2 −2.4306×E+1
C4 −2.5384×E−0
C6 +6.4434×E−1
C8 −3.4867×E−1
C10 +4.9906×E−2

Third' (3'rd) surface (1.472 mm<h: DVD exclusive area)

Aspheric Surface Coefficient

| κ | −2.8416×E−1 | | |
|---|---|---|---|
| A1 | +1.6791×E−2 | P1 | 4.0 |
| A2 | −3.5851×E−3 | P2 | 6.0 |
| A3 | +6.1726×E−4 | P3 | 8.0 |
| A4 | −5.9770×E−4 | P4 | 10.0 |
| A5 | +1.5182×E−4 | P5 | 12.0 |
| A6 | −1.1648×E−5 | P6 | 14.0 |

Optical path difference function (Coefficient of optical path difference function: Standard wavelength 655 nm)

C2 +1.2278×E+1
C4 +6.3980×E−0
C6 −1.0784×E−0
C8 −3.0054×E−1
C10 +8.2782×E−2

Fourth Surface Aspheric Surface Coefficient

| κ | +8.7252×E+0 | | |
|---|---|---|---|
| A1 | +1.9075×E−2 | P1 | 4.0 |
| A2 | −5.0425×E−3 | P2 | 6.0 |
| A3 | +1.8085×E−3 | P3 | 8.0 |
| A4 | −6.8246×E−4 | P4 | 10.0 |
| A5 | +1.6435×E−4 | P5 | 12.0 |
| A6 | −1.5145×E−5 | P6 | 14.0 |

In the Example 1, a function to lengthen the focal distance in the case of CD is carried out by only the diffractive structure of the objective lens, and the coupling lens has only a refractive interface. Correction of spherical aberration caused by a difference in protecting base board thickness is made by the diffractive structure on the area of the objective lens common to DVD and CD.

Next, the second embodiment will be explained as follows, referring to FIG. 2.

This is an optical pickup device wherein a working distance between an objective lens and an optical disk (optical information recording medium) is varied depending on a type of the optical disk in the case of reproduction and recording for the second optical disk 32. FIG. 2 is a diagram showing an example of the optical pickup device in the present embodiment.

Figure 2:
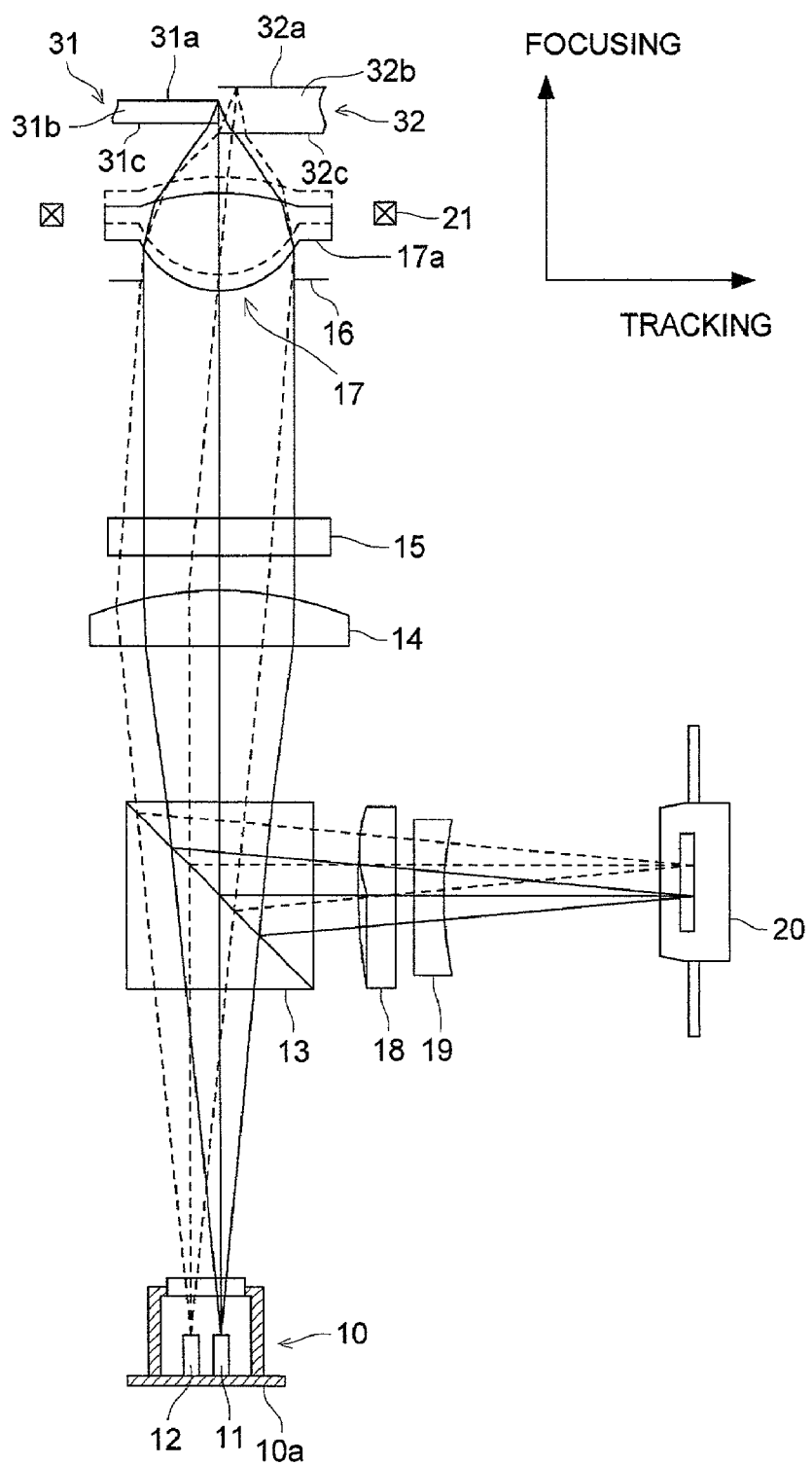
FIG. 2 is a schematic structure of another example of the optical pick-up device showing the embodiment of the invention.

In FIG. 2, there is no change in the structure in which infinite light enters the objective lens from the coupling lens in the case of reproduction and recording for both optical disks 31 and 32.

In FIG. 2, on the optical surface of the objective lens 17, there is formed a ring-shaped diffractive structure which changes a focal length of the objective lens to be shorter when a wavelength of the entering light flux is longer, which is opposite to the occasion in FIG. 1.

Namely, the focal length is longer when conducting reproduction and recording for the second optical disk 32.

Further, a ring-shaped diffractive structure for correction of spherical aberration which corrects spherical aberration caused by a difference of thickness between protecting base boards 31b and 32b respectively of the optical disks 31 and 32 is formed on the central area which includes an optical axis of the objective lens 17 and is used for conducting reproduction and/or recording of information for both of the first optical disk 31 and the second optical disk 32, which is the same as the occasion in FIG. 1.

The optical pickup device in FIG. 2 is structured in the same way as in FIG. 1 excepting the objective lens 17, resulting in acquisition of the effect that is opposite to that in FIG. 1.

In the example in FIG. 2, there is formed, on the optical surface of the objective lens 17, a diffractive structure which changes a focal length of the objective lens to be shorter when a wavelength of the entering light flux is longer in the case of reproduction and recording for the above-mentioned second optical disk 32. Therefore, when a light flux with a long wavelength emitted from the second semiconductor laser 112 enters the objective lens, a focal length becomes shorter, and when the light flux is made by two-axle actuator 21 to form an image on information recording surface 32a of the optical disk 32, a distance (working distance) between the objective lens 17 and surface 32c of the second optical disk 32 becomes shorter. Therefore, it is possible to ensure a sufficient amount of light especially for recording for the second optical disk 32 having a thick protecting base board, which is preferable.

As stated above, in the present embodiment, it is possible to make an optical pickup device to be of a simple structure by using a light source unit in which two light sources each having a different wavelength are formed on the same base board, and it is possible to ensure a sufficient amount of light when conducting recording, in particular, for an optical information recording medium having a thick protecting base board with a light flux having a long wavelength by the use of the light source unit stated above, thus, an optical pickup device that is highly reliable for recording can be realized.

Incidentally, although an arrangement is made in this example so that a focal length is made to be shorter, by a diffractive structure formed on the objective lens, when conducting reproduction and recording for the second optical disk 32, it is also possible either to provide a diffractive structure having the aforesaid function on coupling lens 24, or to provide the diffractive structure on both of the coupling lens 24 and objective lens 17.

Further, in FIG. 2, it is also possible to structure so that finite divergent light may enter the objective lens from the coupling lens even when conducting reproduction and recording for optical disk 31 having a thin protecting base board with a light flux having a short wavelength.

An example of the present embodiment will be explained in the case of the fourth embodiment described later.

Next, there will be explained the third embodiment of the invention which has the same effect as in the first embodiment.

Figure 3:
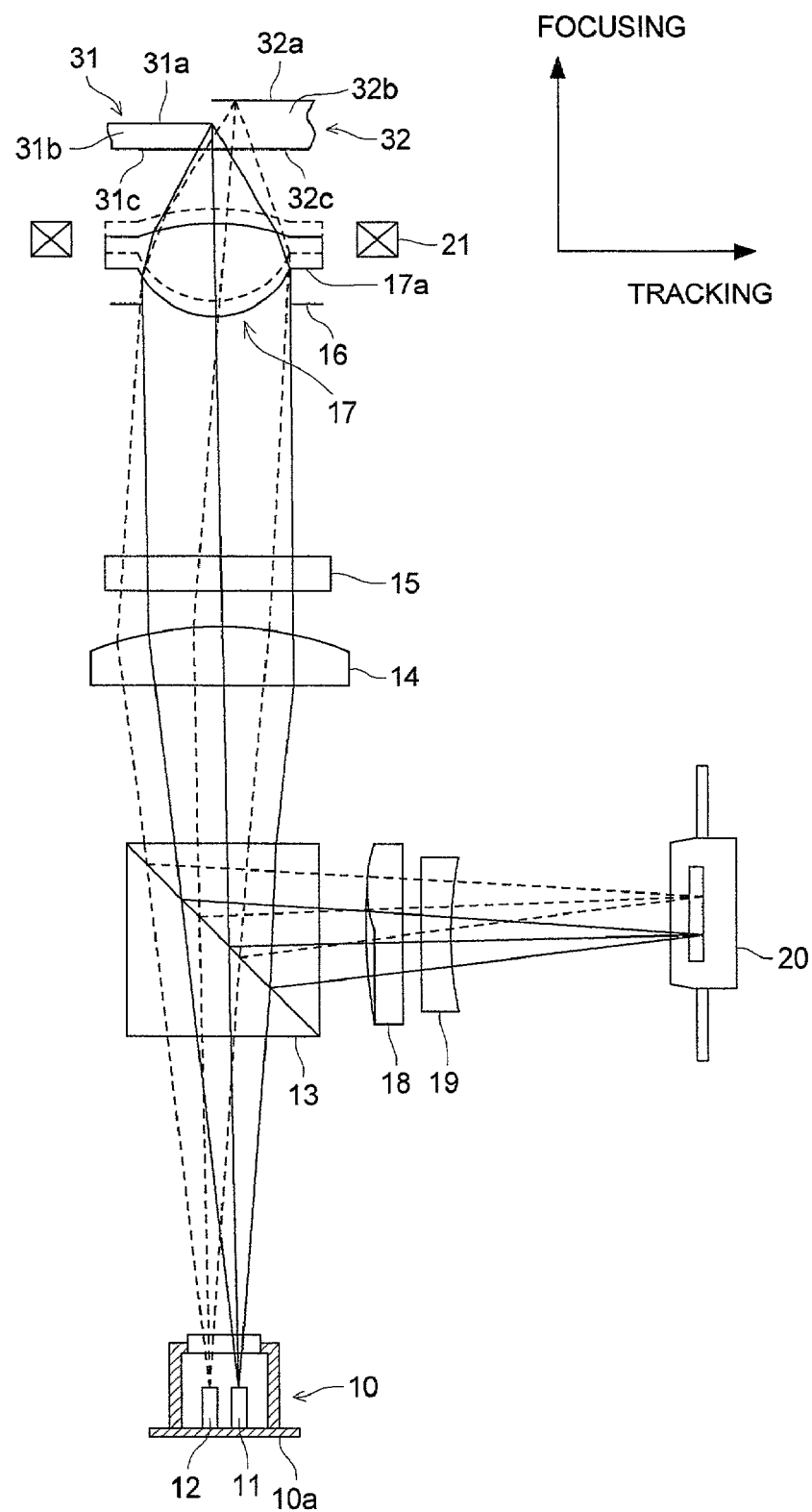
FIG. 3($a$) is a diagram of an optical path at the time of using DVD, and FIG. 3($b$) is a diagram of an optical path at the time of using CD in Example 1.

An optical pickup device wherein finite divergent light enters the objective lens from the coupling lens in the case of reproduction and recording for the second optical disk 32 will be explained as follows, referring to FIG. 3. FIG. 3 is a diagram showing an example of an optical pickup device in the present example.

While it is structured in FIGS. 1 and 2 so that infinite light enters the objective lens from the coupling lens when conducting reproduction and recording for both optical disks 31 and 32, an optical pickup device shown in FIG. 3 is structured so that infinite light enters an objective lens from a coupling lens when conducting reproduction and recording for optical disk 31 having a thin protecting base board with a light flux having a short wavelength, and finite divergent light enters an objective lens from a coupling lens when conducting reproduction and recording for optical disk 32 having a thick protecting base board with a light flux having a long wavelength.

Namely, on the optical surface of the coupling lens 24 in FIG. 3, there is formed a ring-shaped diffractive structure which makes an incident light flux to emerge as finite divergent light when its wavelength is longer, and therefore, a focal length of at least one of the coupling lens 24 and objective lens 17 is made to be longer when conducting reproduction and recording for the second optical disk 32. The optical pickup device in FIG. 3 is structured in the same way as in FIG. 1 excepting the coupling lens 24, which makes it possible to obtain the same effect as in FIG. 1.

Incidentally, in FIG. 3, it is also possible to provide a diffractive structure on each of both the coupling lens 24 and the objective lens 17 for lengthening a focal distance of at least one of the coupling lens 24 and the objective lens 17 when conducting reproduction and recording for the second optical disk 32. Further, in FIG. 3, it is also possible to structure so that finite divergent light enters an objective lens from a coupling lens when conducting reproduction and recording for optical disk 31 having a thin protecting base board with a light flux having a short wavelength.

Data of the present example are shown below. Usable wavelength conditions and other wavelength are the same as those in Example 1.

Example 2

In the Example 2, infinite light enters an objective lens from a coupling lens for DVD, and finite divergent light enters for CD, and FIG. 4(a) shows an optical path diagram for DVD, while, FIG. 4(b) shows an optical path diagram for CD. Table 2 shows lens data of the Example 2.

TABLE 2

| $f_1$ = 3.05 mm | | | $f_2$ = 3.09 mm | |
| NA1: 0.60 | | | NA2: 0.47 | |

| I-th surface | ri | di (655 nm) | ni (655 nm) | di (785 nm) | ni (785 nm) |
| --- | --- | --- | --- | --- | --- |
| 0 |  | 17.3716 |  | 17.3716 |  |
| 1 | 88.74867 | 1.60000 | 1.54094 | 1.60000 | 1.53716 |
| 2 | −7.30236 | 6.00000 | 1.0 | 6.28790 | 1.0 |
| 3 | 1.82937 | 1.52000 | 1.54094 | 1.52000 | 1.53716 |
| 3' | 2.05723 | 1.50627 | 1.54094 | 1.50627 | 1.53716 |
| 4 | −8.68372 | 1.81872 | 1.0 | 1.53074 | 1.0 |
| 5 | ∞ | 0.6 | 1.57752 | 1.2 | 1.57063 |
| 6 | ∞ |  |  |  |  |

Aspheric Surface Data

Second Surface Aspheric Surface Coefficient

| κ  | −9.9953×E−1 |    |     |
|----|-------------|----|-----|
| A1 | −6.0049×E−5 | P1 | 4.0 |

Optical path difference function (Coefficient of optical path difference function: Standard wavelength 720 nm)
C2 +1.9251×E+1
C4 +4.4634×E−3

Third (3rd) surface (0<h<1.475 mm: DVD/CD jointly owned area)

Aspheric Surface Coefficient

| κ  | −2.0055×E−0 |    |      |
|----|-------------|----|------|
| A1 | +2.8214×E−2 | P1 | 4.0  |
| A2 | −2.4511×E−3 | P2 | 6.0  |
| A3 | +4.2788×E−4 | P3 | 8.0  |
| A4 | −5.0123×E−5 | P4 | 10.0 |
| A5 | −1.0112×E−5 | P5 | 12.0 |
| A6 | −6.5235×E−8 | P6 | 14.0 |

Optical path difference function (Coefficient of optical path difference function: Standard wavelength 720 nm)
C2 +9.7222×E+0
C4 −1.8411×E−0
C6 +2.8183×E−2
C8 +3.5444×E−2
C10 −3.1219×E−2

Third' (3'rd) surface (1.475 mm<h: DVD exclusive area)

Aspheric Surface Coefficient

| κ  | −2.4198×E−1 |    |      |
|----|-------------|----|------|
| A1 | +1.3445×E−2 | P1 | 4.0  |
| A2 | −3.4284×E−3 | P2 | 6.0  |
| A3 | +7.5764×E−4 | P3 | 8.0  |
| A4 | −5.8611×E−4 | P4 | 10.0 |
| A5 | +1.3347×E−4 | P5 | 12.0 |
| A6 | −1.0212×E−5 | P6 | 14.0 |

Optical path difference function (Coefficient of optical path difference function: Standard wavelength 655 nm)
C2 −1.0148×E−0
C4 +6.4023×E−0
C6 −1.1542×E−0
C8 −3.0414×E−1
C10 +7.3927×E−2

Fourth Surface Aspheric Surface Coefficient

| κ  | +7.8235×E+0 |    |      |
|----|-------------|----|------|
| A1 | +1.7801×E−2 | P1 | 4.0  |
| A2 | −5.6497×E−3 | P2 | 6.0  |
| A3 | +2.1389×E−3 | P3 | 8.0  |
| A4 | −7.3419×E−4 | P4 | 10.0 |
| A5 | +1.5298×E−4 | P5 | 12.0 |
| A6 | −1.2729×E−5 | P6 | 14.0 |

In the Example 2, a function to lengthen the working distance when divergent light enters in the case of CD is carried out by diffractive structures of the coupling lens and the objective lens. Correction of spherical aberration caused by a difference in protecting base board thickness is made by the diffractive structure on the area of the objective lens common to DVD and CD.

Example 3

Figure 5A:
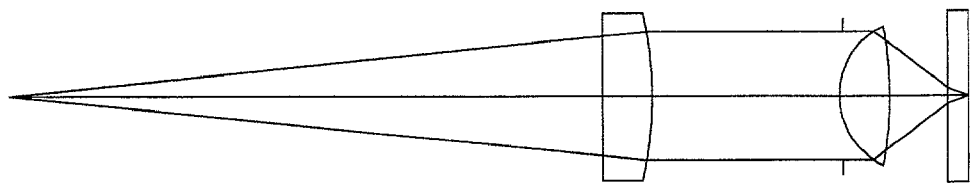
FIG. 5($a$) is a diagram of an optical path at the time of using DVD, and FIG. 5($b$) is a diagram of an optical path at the time of using CD in Examples 3 and 4.
Figure 5B:
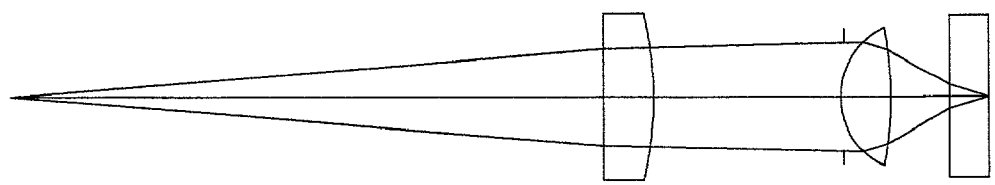

In the Example 3, infinite light enters an objective lens from a coupling lens for DVD, and finite divergent light enters for CD, and FIG. 5(a) shows an optical path diagram for DVD, while, FIG. 5(b) shows an optical path diagram for CD. Table 3 shows lens data of the Example 3.

TABLE 3

| | $f_1$ = 3.05 mm NA1: 0.60 | | $f_2$ = 3.07 mm NA2: 0.47 | |
|---|---|---|---|---|
| I-th surface | ri | di (655 nm) | ni (655 nm) | di (785 nm) | ni (785 nm) |
| 0 |          | 17.3826 |         | 17.3826 |         |
| 1 | 80.73520 | 1.60000 | 1.54094 | 1.60000 | 1.53716 |
| 2 | −6.85541 | 6.00000 | 1.0     | 6.30330 | 1.0     |
| 3 | 1.88389  | 1.47000 | 1.54094 | 1.47000 | 1.53716 |
| 3'| 2.05565  | 1.46272 | 1.54094 | 1.46272 | 1.53716 |
| 4 | −9.64329 | 1.83483 | 1.0     | 1.53146 | 1.0     |
| 5 | ∞        | 0.6     | 1.57752 | 1.2     | 1.57063 |
| 6 | ∞        |         |         |         |         |

Aspheric Surface Data

Second Surface Aspheric Surface Coefficient

| κ  | −9.9961×E−1 |    |     |
|----|-------------|----|-----|
| A1 | −6.7751×E−5 | P1 | 4.0 |

Optical path difference function (Coefficient of optical path difference function: Standard wavelength 720 nm)
C2 +2.3379×E+1
C4 +8.3234×E−3

Third (3rd) surface (0<h<1.476 mm: DVD/CD jointly owned area)

Aspheric Surface Coefficient

| κ  | −2.2840×E−0 |    |      |
|----|-------------|----|------|
| A1 | +3.0582×E−2 | P1 | 4.0  |
| A2 | −2.0576×E−3 | P2 | 6.0  |
| A3 | −7.6888×E−4 | P3 | 8.0  |
| A4 | +5.8070×E−4 | P4 | 10.0 |
| A5 | −1.8776×E−4 | P5 | 12.0 |
| A6 | +2.6647×E−5 | P6 | 14.0 |

Optical path difference function (Coefficient of optical path difference function: Standard wavelength 720 nm)
C4 −2.5478×E−0
C6 +9.5746×E−1
C8 −6.0170×E−1
C10 +1.1464×E−1

Third' (3'rd) surface (1.476 mm<h: DVD exclusive area)

Aspheric Surface Coefficient

| κ | −2.7088×E−1 | | |
|---|---|---|---|
| A1 | +1.2543×E−2 | P1 | 4.0 |
| A2 | −3.9770×E−3 | P2 | 6.0 |
| A3 | +7.1750×E−4 | P3 | 8.0 |
| A4 | −5.4955×E−4 | P4 | 10.0 |
| A5 | +1.4760×E−4 | P5 | 12.0 |
| A6 | −1.1841×E−5 | P6 | 14.0 |

Optical path difference function (Coefficient of optical path difference function: Standard wavelength 655 nm)

C2 −9.9054×E−0

C4 +6.9624×E−0

C6 −1.4288×E−0

C8 −4.5998×E−1

C10 +1.3210×E−1

Fourth Surface Aspheric Surface Coefficient

| κ | +1.2036×E+1 | | |
|---|---|---|---|
| A1 | +1.6950×E−2 | P1 | 4.0 |
| A2 | −5.6699×E−3 | P2 | 6.0 |
| A3 | +2.1709×E−3 | P3 | 8.0 |
| A4 | −6.9253×E−4 | P4 | 10.0 |
| A5 | +1.3622×E−4 | P5 | 12.0 |
| A6 | −1.1152×E−5 | P6 | 14.0 |

In the Example 3, a function to lengthen the working distance when divergent light enters in the case of CD is carried out only by the diffractive structures of the coupling lens. Correction of spherical aberration caused by a difference in protecting base board thickness is made by the diffractive structure on the area of the objective lens common to DVD and CD.

Example 4

In the Example 4, infinite light enters an objective lens from a coupling lens for DVD in the same way as in Example 3, and finite divergent light enters for CD, and an optical path diagram for DVD is the same as FIG. 5(a) and an optical path diagram for CD is the same as FIG. 5(b). Table 4 shows lens data of the Example 4.

TABLE 4

| | $f_1$ = 3.05 mm NA1: 0.60 | | $f_2$ = 3.07 mm NA2: 0.47 | | |
|---|---|---|---|---|---|
| i-th surface | ri | di (655 nm) | ni (655 nm) | di (785 nm) | ni (785 nm) |
| 0 | | 17.3915 | | 17.3915 | |
| 1 | 75.24211 | 1.60000 | 1.54094 | 1.60000 | 1.53716 |
| 2 | −5.71442 | 6.00000 | 1.0 | 6.27270 | 1.0 |
| 3 | 1.88888 | 1.52000 | 1.54094 | 1.52000 | 1.53716 |
| 3' | 2.08796 | 1.50939 | 1.54094 | 1.50939 | 1.53716 |
| 4 | −9.35577 | 1.80787 | 1.0 | 1.53524 | 1.0 |
| 5 | ∞ | 0.6 | 1.57752 | 1.2 | 1.57063 |
| 6 | ∞ | | | | |

Aspheric Surface Data

Second Surface Aspheric Surface Coefficient

| κ | −1.0768×E−0 | | |
|---|---|---|---|
| A1 | −1.5979×E−4 | P1 | 4.0 |

Optical path difference function (Coefficient of optical path difference function: Standard wavelength 720 nm)

C2 +3.5764×E+1

C4 +2.7452×E−2

Third (3rd) surface (0<h<1.475 mm: DVD/CD jointly owned area)

Aspheric Surface Coefficient

| κ | −1.9772×E−0 | | |
|---|---|---|---|
| A1 | +2.6860×E−2 | P1 | 4.0 |
| A2 | −2.8939×E−3 | P2 | 6.0 |
| A3 | +9.6795×E−4 | P3 | 8.0 |
| A4 | −3.2232×E−4 | P4 | 10.0 |
| A5 | +6.6234×E−5 | P5 | 12.0 |
| A6 | −9.1147×E−6 | P6 | 14.0 |

Optical path difference function (Coefficient of optical path difference function: Standard wavelength 720 nm)

C4 −1.0144×E−0

C6 −4.1550×E−1

C8 +2.1167×E−1

C10 −5.4612×E−2

Third' (3'rd) surface (1.475 mm<h: DVD exclusive area)

Aspheric Surface Coefficient

| κ | −2.4229×E−1 | | |
|---|---|---|---|
| A1 | +1.1917×E−2 | P1 | 4.0 |
| A2 | −3.2572×E−3 | P2 | 6.0 |
| A3 | +8.6551×E−4 | P3 | 8.0 |
| A4 | −5.8071×E−4 | P4 | 10.0 |
| A5 | +1.2914×E−4 | P5 | 12.0 |
| A6 | −1.0047×E−5 | P6 | 14.0 |

Optical path difference function (Coefficient of optical path difference function: Standard wavelength 655 nm)

C2 −9.7840×E−0

C4 +5.9704×E−0

C6 −1.0009×E−0

C8 −2.5057×E−1

C10 +6.0466×E−2

Fourth Surface Aspheric Surface Coefficient

| κ | +9.8537×E+0 | | |
|---|---|---|---|
| A1 | +1.7105×E−2 | P1 | 4.0 |
| A2 | −5.7637×E−3 | P2 | 6.0 |
| A3 | +2.1716×E−3 | P3 | 8.0 |
| A4 | −7.1029×E−4 | P4 | 10.0 |
| A5 | +1.4383×E−4 | P5 | 12.0 |
| A6 | −1.1906×E−5 | P6 | 14.0 |

In the Example 4, a function to lengthen the working distance when divergent light enters in the case of CD is carried out only by the diffractive structures of the coupling lens. Correction of spherical aberration caused by a difference in protecting base board thickness is made by the diffractive structure on the area of the objective lens common to DVD and CD.

Example 5

Figure 6A:
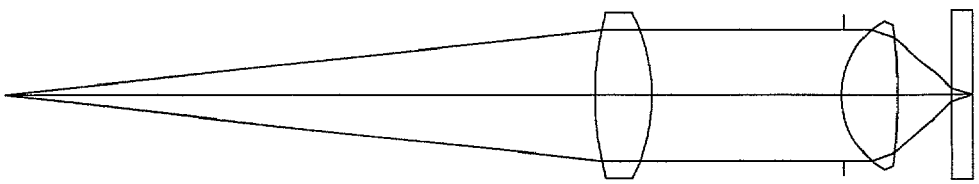
Figure 6B:
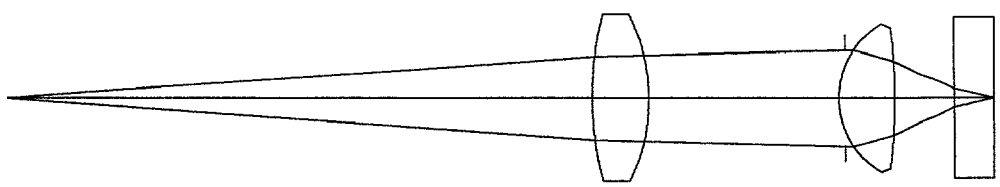

In the Example 5, infinite light enters an objective lens from a coupling lens for DVD, and finite divergent light enters for CD, and FIG. 6(a) shows an optical path diagram for DVD, while, FIG. 6(b) shows an optical path diagram for CD. Table 5 shows lens data of the Example 5.

TABLE 5

| $f_1 = 3.05$ mm NA1: 0.60 | | | $f_2 = 3.07$ mm NA2: 0.44 | | |
|---|---|---|---|---|---|
| i-th surface | ri | di (655 nm) | ni (655 nm) | di (785 nm) | ni (785 nm) |
| 0 | | 18.2388 | | 18.2388 | |
| 1 | 10.48392 | 1.60000 | 1.54094 | 1.60000 | 1.53716 |
| 2 | −5.15575 | 6.00000 | 1.0 | 6.17760 | 1.0 |
| 3 | 1.91493 | 1.72000 | 1.54094 | 1.72000 | 1.53716 |
| 3' | 2.09798 | 1.70156 | 1.54094 | 1.70156 | 1.53716 |
| 4 | −8.16118 | 1.70862 | 1.0 | 1.53100 | 1.0 |
| 5 | ∞ | 0.6 | 1.57752 | 1.2 | 1.57063 |
| 6 | ∞ | | | | |

Aspheric Surface Data

Second Surface Aspheric Surface Coefficient

| κ | −1.0717×E−0 | | |
|---|---|---|---|
| A1 | +1.8568×E−5 | P1 | 4.0 |
| A2 | +7.1583×E−7 | P2 | 6.0 |

Optical path difference function (Coefficient of optical path difference function: Standard wavelength 720 nm)
C2 +7.7634×E+1
C4 +1.5747×E−1

Third (3rd) surface (0<h<1.449 mm: DVD/CD jointly owned area)
Aspheric Surface Coefficient

| κ | −1.7648×E−0 | | |
|---|---|---|---|
| A1 | +2.2810×E−2 | P1 | 4.0 |
| A2 | −2.7816×E−4 | P2 | 6.0 |
| A3 | −7.5905×E−4 | P3 | 8.0 |
| A4 | +6.3413×E−4 | P4 | 10.0 |
| A5 | −2.0893×E−4 | P5 | 12.0 |
| A6 | +2.4172×E−5 | P6 | 14.0 |

Third' (3'rd) surface (1.449 mm<h: DVD exclusive area)
Aspheric Surface Coefficient

| κ | −2.8701×E−1 | | |
|---|---|---|---|
| A1 | +1.4380×E−2 | P1 | 4.0 |
| A2 | −6.6600×E−3 | P2 | 6.0 |
| A3 | +1.8084×E−3 | P3 | 8.0 |
| A4 | −3.9426×E−4 | P4 | 10.0 |
| A5 | +3.9775×E−5 | P5 | 12.0 |
| A6 | −4.0014×E−6 | P6 | 14.0 |

Optical path difference function (Coefficient of optical path difference function: Standard wavelength 655 nm)
C2 +7.9771×E−0
C4 −6.5535×E−0
C6 +1.4002×E−0
C8 +8.0557×E−2
C10 −5.8437×E−2

Fourth Surface Aspheric Surface Coefficient

| κ | +5.2852×E+0 | | |
|---|---|---|---|
| A1 | +2.0506×E−2 | P1 | 4.0 |
| A2 | −8.7119×E−3 | P2 | 6.0 |
| A3 | +5.3257×E−3 | P3 | 8.0 |
| A4 | −2.6913×E−3 | P4 | 10.0 |
| A5 | +7.1906×E−4 | P5 | 12.0 |
| A6 | −7.4793×E−5 | P6 | 14.0 |

In the Example 5, a function to lengthen the working distance when divergent light enters in the case of CD is carried out only by the diffractive structures of the coupling lens. Correction of spherical aberration caused by a difference in protecting base board thickness is made by the diffractive structure on the area of the objective lens common to DVD and CD.

Next, the fourth embodiment of the present invention will be explained. This embodiment provides the same effect as that by the second embodiment.

Figure 4:
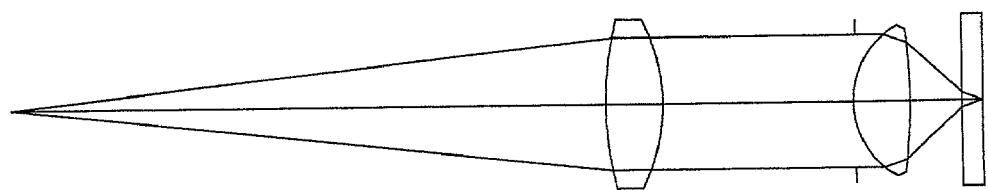
FIG. 4($a$) is a diagram of an optical path at the time of using DVD, and FIG. 4($b$) is a diagram of an optical path at the time of using CD in Example 2.
Figure 4:
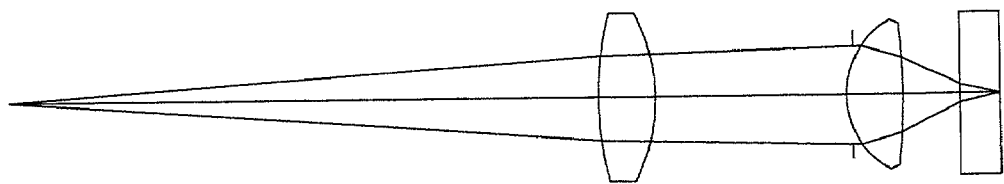

With FIG. 7, an optical pickup apparatus in which a finite convergent light flux proceeds from the coupling lens to the objective lens at time of conducting recording or reproducing the second optical disk, will be explained. FIG. 4 shows an example of the optical pickup apparatus of the present embodiment.

Figure 7:
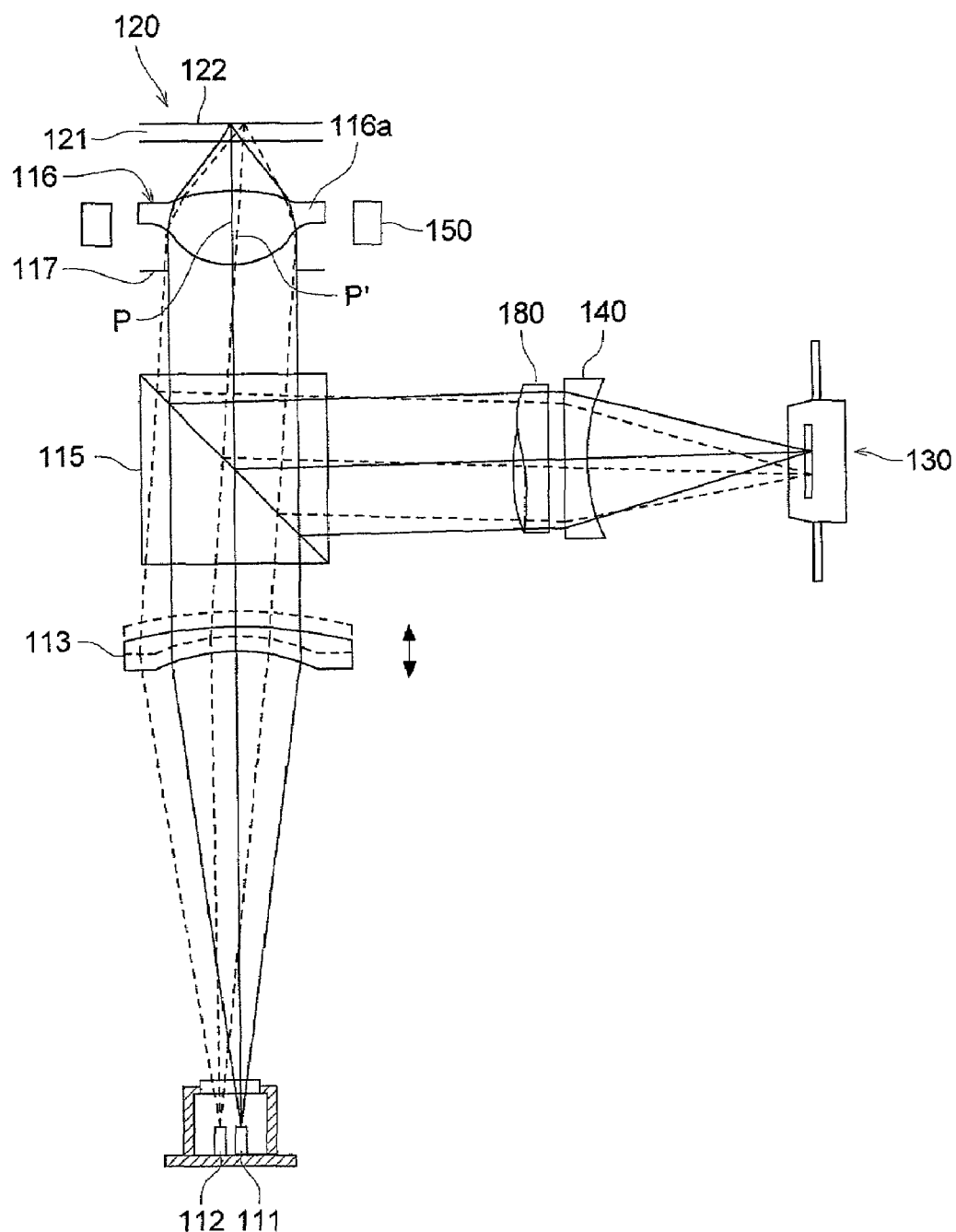
FIG. 7 is an optical path drawing showing a schematic structure of the optical pick-up device showing the embodiment of the invention.

An optical pick-up device shown in FIG. 7 is structured so as to perform the recording or reproduction (the reproduction of information only for DVD-ROM) of information from the information recording surfaces, by the light fluxes of the first and second light sources having the wavelengths of 655 nm and 785 nm respectively, concerning CD-R whose thickness of the transparent base board is 1.2 mm and DVD-ROM whose thickness of the transparent base board is 0.6 mm.

As shown in FIG. 7, the optical pick-up device is provided with the light sources unitized by first semiconductor laser (the first light source) 111 which emits light having the wavelength 655 nm for DVD-ROM use, and second semiconductor laser (the second light source) 112 which emits light having the wavelength 785 nm for CD-R use. Beam splitter 115 is arranged between collimator 113 representing the coupling lens and objective lens 116, light nearly collimated by the collimator 113 passes through the beam splitter 115 and travels to the objective lens 116. Further, the light flux reflected on information recording surface 122 of optical disk 120 having transparent base board 121 changes its optical path to travel to optical detector 130 on the beam splitter 115 representing the optical path changing means. The objective lens 116 is provided with flange section 116a on the peripheral area, and the objective lens 116 can be attached to the optical pick-up device easily by the flange section 116a. Further, since the flange section 116a is provided with the surface extending in the direction perpendicular to the optical axis of the objective lens 116, it is easily possible to perform the more accurate attachment.

In the case of reproducing the first optical disk (DVD-ROM), the light flux emitted from the first semiconductor laser 111 passes through collimator 113 to be a parallel light flux, as shown by the solid line. Further, the light flux passes through the beam splitter 115, and is stopped down by diaphragm 117, then the light flux is converged on the information recording surface 122 by the objective lens 116 via the transparent base board 121 of the first optical disk 120. Still further, the light flux which has been modulated by an information bit and reflected on the information recording surface 122 is reflected on the beam splitter 115 after passing through the objective lens 116 and the diaphragm 117 again, and is used for the focusing detection and the track detection. Based on the detections, two dimension actuator 150 focuses the light flux from semiconductor laser 111 on the information recording surface 122 of the optical disk 120, and the light flux is given astigmatism by cylindrical lens 180, then enters the optical detector 130 via concave lens 140, and the reading signal of information recorded on the first optical disk 120 is obtained by the signal outputted from the optical detector 130.

Further, by the detection of the change of the light amount caused by the change of the formation of the spot and the change of the position on the optical detector 130, the objective lens 116 is moved to be in focus, and is moved so that the light flux from the first semiconductor laser 111 may be focused on the prescribed track.

Next, in the case of reproducing the second optical disk (CD-R), the light flux emitted from the second semiconductor laser 112 passes through the collimator 113, as shown by the broken lines. Further, the light flux passes through the beam splitter 115, and is stopped down by the diaphragm 117, then the light flux is converged on the information recording surface 122 by the objective lens 116 via the transparent base board 121 of the second optical disk 120. Then the light flux which has been modulated by the information pit and reflected on the information recording surface 122 is reflected on the beam splitter 115 after passing through the objective lens 116 and the diaphragm 117 again, and is given astigmatism by the cylindrical lens 180, then enters the optical detector 130 via concave lens 140. Then the reading signal of information recorded on the second optical disk 120 is obtained, using the signal outputted from the optical detector 130.

Further, the focusing detection and track detection are performed, by the detection of the change of the light amount caused by the change of the formation and the change of the position of the spot on the optical detector 130. Based on the detection, the two-dimensional actuator 150 moves the objective lens 116 so that the light flux from the second semiconductor laser 112 is focused on the information recording surface 122 of the second optical disk 120, and moves the objective lens 116 so that the light flux from the second semiconductor laser 112 is focused on the prescribed track.

Here, there is a difference of the magnifications between the case that the light flux from the first semiconductor laser 111 passes through and the case that the light flux from the second semiconductor laser 112 passes through, as mentioned later, since there is formed the diffractive structure as the optical functional area on the collimator 113 and the optical surface of the objective lens 116.

That is, it is possible to obtain sufficient amount of light in the case of performing the recording or reproduction of information for CD-R, by the manner that the collimator 113 is made to move to the objective lens side in the optical direction for the prescribed length in accordance with the wavelength difference of the light sources so that the convergent light is made to enter the objective lens 116, and by the manner that the degree of the convergence is made to be strong by the diffractive effect of the diffractive structure, when the recording or reproduction of information for CD-R is performed. In the present embodiment, therefore, it is possible to perform the reproduction of information for DVD-ROM and the recording/reproduction of information for CD-R, by using the same light convergent optical system, in the optical pick-up device with a simple structure in which two light sources having the different wavelengths are formed on a single base board.

In other words, in this example, it is constituted so that the infinite light flux enters the objective lens from the coupling lens, when the reproduction and recording for light disk 31 having the thinner protection base board are performed by the light flux having the short wavelength, while the finite convergent light flux enters the objective lens from the coupling lens, when the reproduction and recording for light disk 32 having the thicker protection base board are performed by the light flux having the longer wavelength.

Incidentally, in FIG. 7, in order to make the focal length of at least either one of the coupling lens 24 and the objective lens 17 to be short, when the reproduction and recording are performed for the second optical disk 32, it is possible to provide the diffractive structure on both of the coupling lens 24 and the objective lens 17. Further, in FIG. 4, it is also possible to constitute the manner that the finite convergent light flux enters the objective lens from the coupling lens, when the reproduction and recording are performed for the optical disk 31 having the thinner protection base board, by the light flux having the short wavelength.

The data enforced in the embodiment of the invention are shown as follows. The condition of the wavelength is the same as that of the other example.

The aforementioned embodiment is the one relating to the objective lens which can be used for the above-mentioned second embodiment and the fourth embodiment.

In this example, the diffractive structures are provided on both of the coupling lens and the objective lens, and there is constituted that the magnification for CD is made to be smaller by their comprehensive action.

Figure 8:
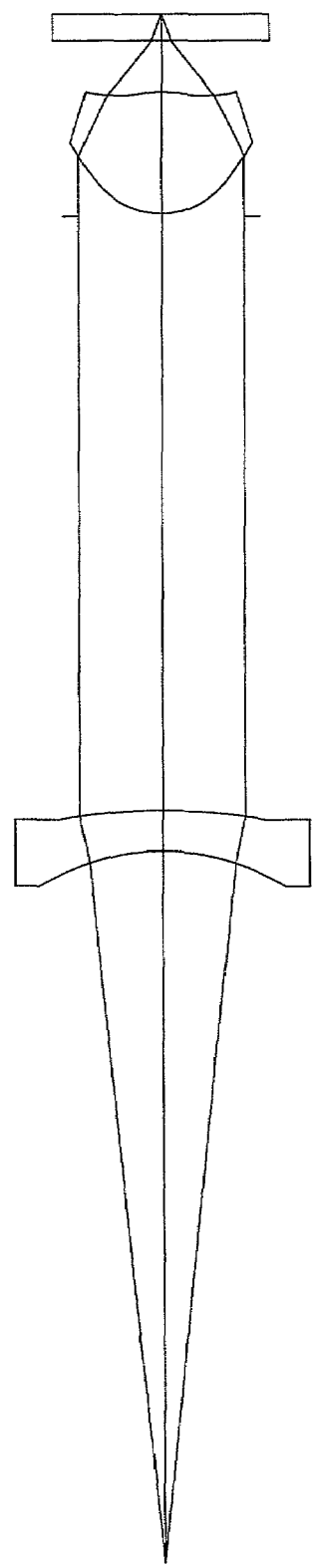
FIG. 8 is a section of the light convergent optical system composed of the collimator and the objective lens shown in FIG. 1 in which DVD is used.
Figure 9:
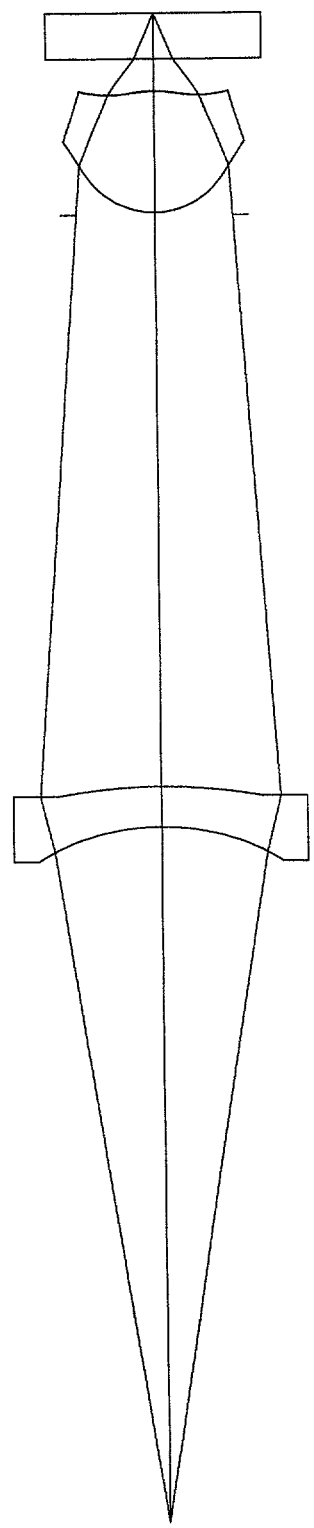
FIG. 9 is a section of the light convergent optical system composed of the collimator and the objective lens shown in FIG. 1 in which CD is used.
Figure 10A:
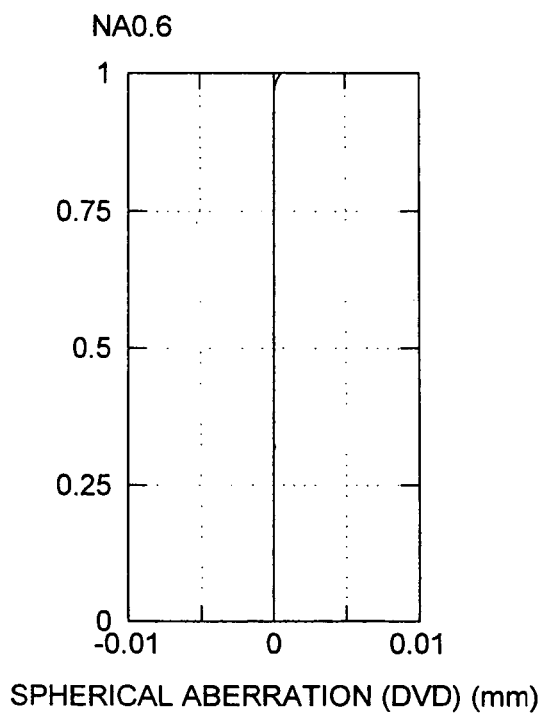
FIGS. 10($a$) and 10($b$) show the drawings of the spherical aberrations for the objective lens of the embodiment in which DVD-ROM and CD-R are used respectively.
Figure 10B:
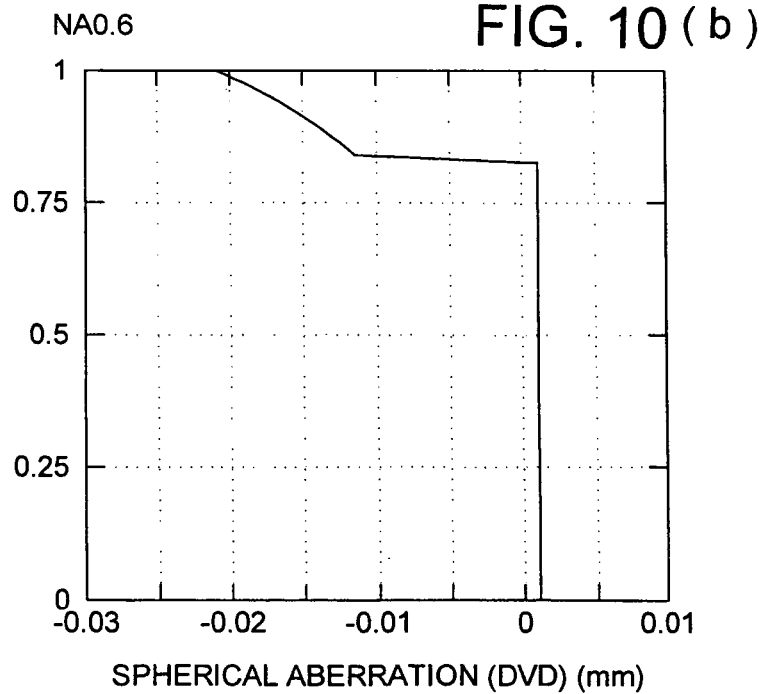

The following example relates to the objective lens which can be used for the above-mentioned embodiment. FIG. 8 is a section of the light convergent optical system composed of the collimator (coupling lens) and the objective lens shown in FIG. 7 in which a DVD is used. FIG. 9 is a section in which CD-R is used. FIGS. 10(a) and 10(b) represent the drawings of the spherical aberrations showing respectively the objective lens of the embodiment wherein DVD-ROM is used and the objective lens of the embodiment wherein CD-R is used. Tables 6 and 7 show lens data of the objective lenses of the embodiments. Incidentally, hereinafter (including data in the Tables), let it be assumed that an exponent of 10 (for example, $2.5 \times 10^{-3}$) is expressed by E (for example, 2.5×E−3). Table 8 shows the refractive index of the objective lens.

TABLE 6

Example

| | | | | |
|---|---|---|---|---|
| Wavelength λ, (nm) | | 655 | 785 | |
| Magnification of optical system | | −0.167 | −0.250 | |
| Diffractive order (coupling lens) | | 1 | 1 | |
| Focal length (coupling lens) (mm) | | 18.00 | 11.93 | |
| Diffractive order (objective lens) | | 1 | 1 | |
| Focal length (objective lens) (mm) | | 3.00 | 3.20 | |
| Necessary numerical aperture (objective lens) | | 0.60 | 0.50 | |

| i | ri | d1i | d2i | material |
|---|---|---|---|---|
| 1 | ∞ | 16.207 | 16.207 | |
| 2 | −4.2856 | 0.906 | 0.906 | olefin type resin |
| 3 | −13.8632 | 13.440 | 13.440 | |
| 4 | | 2.759 | 2.759 | olefin type resin |
| 5 | −4.2221 | 1.190 | 0.677 | |
| 6 | ∞ | 0.60 | 1.20 | PC |

Suffix 1 is the case λ = 655 nm
Suffix 2 is the case λ = 785 nm

TABLE 7

| 2nd surface aspherical coefficient | |
|---|---|
| κ | −4.8472E+00 |
| A4 | −5.7670E−03 |
| A6 | 8.5538E−04 |
| A8 | −1.1569E−04 |
| A10 | 8.4443E−06 |
| 3rd surface aspherical coefficient | |
| κ | −9.2469E+00 |
| A4 | 4.9120E−04 |
| A6 | 1.4426E−04 |
| A8 | −3.1120E−05 |
| A10 | 2.6792E−06 |
| Coefficient of optical path difference function (blazing wavelength = 1 mm) | |
| B2 | −9.9387E+01 |
| B4 | 1.2537E−01 |
| B6 | −1.7283E−02 |
| B8 | 5.2052E−03 |
| B10 | −6.6127E−04 |
| 4th surface (boundary area hb = 1.411 mm) 1st area (0 ≦ h < hb) aspherical coefficient | |
| r | 1.4060E+00 |
| κ | −9.0056E−01 |
| A4 | 7.0847E−03 |
| A6 | −1.8286E−03 |
| A8 | 1.0287E−03 |
| A10 | −8.0941E−05 |
| Coefficient of optical path difference function (blazing wavelength = 1 mm) | |
| B2 | 9.0419E+01 |
| B4 | −2.4510E+00 |
| B6 | −1.8398E+00 |
| B8 | 7.0430E−01 |
| B10 | −1.2302E−01 |
| 2nd area (hb ≦ h) aspherical coefficient | |
| r | 1.4177E+00 |
| κ | −9.0846E−01 |
| A0 | 8.7100E−04 |
| A4 | 6.7413E−03 |
| A6 | −1.8657E−03 |
| A8 | 1.0678E−03 |
| A10 | −1.2006E−04 |

TABLE 7-continued

| Coefficient of optical path difference function (blazing wavelength = 1 mm) | |
|---|---|
| B2 | 8.8725E+01 |
| B4 | −3.0310E+00 |
| B6 | −2.0714E+00 |
| B8 | 8.1531E−01 |
| B10 | −1.5601E−01 |
| 5th surface aspherical coefficient | |
| κ | −4.7738E+01 |
| A4 | 3.8694E−03 |
| A6 | 1.1460E−02 |
| A8 | −1.2825E−03 |
| A10 | −1.1275E−03 |
| A12 | 2.6994E−04 |
| A14 | 4.4798E−05 |

TABLE 8 refractive index

| wavelength | 655 nm | 785 nm |
|---|---|---|
| olefin type resin | 1.54094 | 1.53716 |
| PC | 1.57752 | 1.57063 |

The objective lens of the example is composed of a plastic lens having aspheric surfaces on both surfaces, and each aspheric surface has an aspheric shape shown by formula 3.

$$Z = \frac{h^2/r}{1 + \sqrt{1 - (1+\kappa)(h/r)^2}} + \sum_{i=0}^{\infty} A_{2i} h^{2i} \qquad [\text{Formula 3}]$$

Incidentally, Z is representing an axis in the direction of an optical axis, h is representing an axis in the direction perpendicular to the optical axis, r is representing a paraxial radius of curvature, κ is representing a constant of the cone, and A is representing an aspherical coefficient.

Generally, the diffractive structure is shown by the formula 4, in which the optical path difference function is represented by ΦB, and a unit is mm.

$$\Phi_B = \sum_{i=0}^{\infty} B2i h^{2i} \qquad [\text{Formula 4}]$$

Further, it is possible to give paraxial power to the diffractive section by making the 2nd order coefficient to be non-zero value. Further, it is possible to control the spherical aberration, by making the coefficients of the optical difference function other than the 2nd order coefficient such as 4th order coefficient, and 6th order coefficient to be non-zero values, and it is also possible to raise the refractive index for the light flux having the wavelength 785 nm greater than the light flux having the wavelength 655 nm.

Further, by the design of the diffractive structure, it is possible to correct the spherical aberration totally, by applying the spherical aberration having an opposite characteristic at the diffractive section to the spherical aberration existing in the refractive section, or it is possible to make the total spherical aberration to be the desired amount of flare, by operating the spherical aberration in the diffractive section.

For example, it is possible to regard the spherical aberration caused by the change of temperature as the sum of the spherical aberration in the refractive section caused by the change of temperature and the change of the spherical aberration in the diffractive section.

In the embodiments and examples mentioned above, though the diffractive structures are provided in both of the coupling lens and the objective lens, it is enough if it is provided in either one of them. Though the incident light flux to the objective lens is stopped down in CD use more than in DVD use, it is also possible to attain this function by the diffractive structure only, or by the movement only of the coupling lens in the direction of the optical axis. Further, though the parallel light flux enters the objective lens in DVD use, and the convergent light flux enters the objective lens in CD use, it is sufficient, if either one of the finite divergent light flux, the infinite (parallel) light flux, and the finite convergent light flux is used so that the magnification for CD use is smaller than the case of DVD use.

Structures of coupling lenses and objective lenses in the Examples 1–5 stated above are shown in Table 9.

distance $WD_{CD}$ from the vertex of the lens surface of the objective lens to the surface of CD is lengthened by 0.125 mm and is further lengthened by 0.075 mm by entering of finite divergent light to be extended finally to 1.53 mm.

In the Example 4, an axial thickness of the objective lens is thinner than the conventional one by 0.2 mm, and distance $WD_{CD}$ from the vertex of the lens surface of the objective lens to the surface of CD is lengthened by 0.1 mm and is further lengthened by 0.1 mm by entering of finite divergent light to be extended finally to 1.53 mm.

In the Example 5, an axial thickness of the objective lens is the same as the conventional one, and distance $WD_{CD}$ from the objective lens to the surface of CD is lengthened by 0.2 mm to be extended finally to 1.53 mm.

In the Tables 1–5 above, f1 represents a focal length by refracting power of the objective lens for the information recording surface of DVD, f2 represents a focal length for the information recording surface of CD, NA1 represents a numerical aperture of the objective lens on the image side for DVD, and NA2 represents a numerical aperture on the image side for CD.

TABLE 9

| | Coupling lens | | | Objective lens | | | | | | Optical system |
|---|---|---|---|---|---|---|---|---|---|---|
| Exam-ple | Struc-ture | Focal length | | Paraxial thickness | Structure | $WD_{CD}$ | Focal length | | Magnification | | charac-teristics |
| | | $f_{DVD}$ | $f_{CD}$ | | | | $f_{DVD}$ | $f_{CD}$ | $m_{DVD}$ | $m_{CD}$ | $\Delta I_{DVD}/\Delta\lambda$ |
| 1 | Refraction | 18.30 | 18.43 | 1.52 | Diffraction (Paraxial) | 1.53 | 3.05 | 3.13 | 0 | 0 | 0.67 |
| 2 | Diffraction | 18.30 | 20.36 | 1.52 | Diffraction (Paraxial) | 1.53 | 3.05 | 3.09 | 0 | −0.0175 | 0.76 |
| 3 | Diffraction | 18.30 | 20.83 | 1.47 | Diffraction | 1.53 | 3.05 | 3.07 | 0 | −0.0209 | 0.65 |
| 4 | Diffraction | 18.30 | 22.37 | 1.52 | Diffraction | 1.53 | 3.05 | 3.07 | 0 | −0.0316 | 0.89 |
| 5 | Diffraction | 18.30 | 28.13 | 1.72 | Refraction | 1.53 | 3.05 | 3.07 | 0 | −0.0608 | 1.56 |

$f_{DVD}$: Focal length of DVD
$f_{CD}$: Focal length of CD
$WD_{CD}$: Distance from a vertex of the lens surface of an objective lens to the disk surface (CD)
$I_{DVD}$: Position of an image forming point
$\Delta I_{DVD}/\Delta\lambda$: Rate of a change in a position of an image forming point in the vicinity of wavelength 655 nm: unit (μm/nm)

As shown in Table 9, an axial thickness of the objective lens is thinner than the conventional one by 0.2 mm, distance (working distance) $WD_{CD}$ from the vertex of the lens surface of the objective lens to the surface of CD is lengthened by 0.1 mm and is further lengthened by 0.1 mm by a paraxial power of the diffractive structure of the objective lens, and distance $WD_{CD}$ is extended to 1.53 mm, in the Example 1. Incidentally, in the conventional structure, an axial thickness of the objective lens was 1.72 mm and distance $WD_{CD}$ to the surface of CD was 1.33 mm, and therefore, the distance $WD_{CD}$ was 1.43 mm even when the axial thickness of the objective lens was thinned by 0.2 mm.

In the Example 2, an axial thickness of the objective lens is thinner than the conventional one by 0.2 mm, and distance $WD_{CD}$ from the vertex of the lens surface of the objective lens to the surface of CD is lengthened by 0.1 mm and is further lengthened by 0.1 mm by a paraxial power of the diffractive structure of the objective lens and by entering of finite divergent light to be extended finally to 1.53 mm.

In the Example 3, an axial thickness of the objective lens is thinner than the conventional one by 0.25 mm, and In the Examples 1 and 2, the objective lens has paraxial refracting power on the area which is common to DVD and CD, and a diffractive structure provided on the area common to DVD and CD has a function to lengthen a focal length of the objective lens and a function to correct spherical aberration caused by a difference in protecting base board thickness. In the Examples 3, 4 and 5, the objective lens does not have paraxial refracting power on the area which is common to DVD and CD, and the diffractive structure provided on the area common to DVD and CD corrects spherical aberration caused by a difference in protecting base board thickness.

Further, as shown in FIG. 6, finite optical magnification $m_{CD}$ by the objective lens for CD is within a range of $-1/12 < m_{CD} < 0$. Further, image forming position change rate $\Delta I_{DVD}/\Delta\lambda$ (μm/nm) in the vicinity of wavelength 655 nm on the information recording surface of DVD is within a range of 0.5–2.0.

In the Table or the drawing mentioned above, E (or e) is sometimes used to express an exponent of 10, exemplifying, for example, E–02 ($=10^{-2}$).

The invention has been explained as stated above, referring to the examples, to which, however, the invention is not limited, and may be varied in many ways within a scope of the technical spirit of the invention. For example, the first optical information recording medium (first optical disk) with a thin protecting base board conducting reproduction and recording of information by using the first light source having a short wavelength has been explained with an example of DVD, and the second optical information recording medium (second optical disk) with a thick protecting base board conducting reproduction and recording of information by using the second light source having a long wavelength has been explained with an example of CD. However, the invention can be applied not only to these optical information recording media but also to a higher density optical disk having a protecting base board with a thickness of about 0.1 mm employing a wavelength of about 400 nm and to DVD.

BY the present invention, it is possible to provide the optical pick-up device which can perform the recording or reproduction of information for the different optical information recording media, by using the light source unit in which a plurality of light sources having different wavelengths are arranged on the single base board and a single light-convergent optical system, and to provide the objective lens used therein. The invention is suitable for the optical pick-up device for the DVD exclusive reproduction representing the combo drive, and for the CD recording/reproduction.

The optical pickup device and the objective lens used for the optical pickup device make it possible to conduct recording and reproduction of information for a plurality of optical information recording media each having a different protecting base board thickness by using a light source unit in which a plurality of light sources each having a different wavelength are arranged on the same base plate, and they make it possible to ensure a sufficient working distance for the optical information recording medium having a thick protecting base board.

What is claimed is:

1. An optical pickup apparatus, comprising:
a light source unit in which a first light source to emit a first light flux having a wavelength λ1 and a second light source to emit a second light flux having a wavelength λ2 (λ2>λ1) are mounted on a same base board;
a converging optical system to conduct recording or reproducing information for an information recording plane of a first optical information recording medium having a first protective base plate having a thickness t1 by converging the first light flux from the first light source on the information recording plane of the first optical information recording medium and to conduct recording or reproducing information for an information recording plane of a second optical information recording medium having a second protective base plate having a thickness t2 (t2>t1) by converging the second light flux from the second light source on the information recording plane of the second optical information recording medium;
wherein the converging optical system comprises,
a coupling lens into which the first light flux emitted from the first light source or the second light flux emitted from the second light source proceed to be incident;
an objective lens to converge the first or second light flux having passed through the coupling lens on the information recording plane of the first or second optical information recording medium; and
a diffractive structure which is structured such that a focal length of the first light flux from the first light source passing through the diffractive structure is different from a focal length of the second light flux from the second light source passing through the diffractive structure,
wherein the diffractive structure is provided on at least one optical surface of the coupling lens.

2. The optical pickup apparatus of claim 1, wherein the diffractive structure is structured such that the focal length of the second light flux from the second light source passing through the diffractive structure is made shorter than the focal length of the first light flux from the first light source passing through the diffractive structure.

3. The optical pickup apparatus of claim 1, wherein the diffractive structure is structured such that the focal length of the second light flux from the second light source passing through the diffractive structure is made longer than the focal length of the first light flux from the first light source passing through the diffractive structure.

4. The optical pickup apparatus of claim 1, wherein the diffractive structure is further provided on at least one optical surface of the objective lens.

5. The optical pickup apparatus of claim 4, wherein the objective lens is structured to focus the first light flux from the first light source and the second light flux from the second light source at an almost same point.

6. The optical pickup apparatus of claim 5, wherein the objective lens is structured to focus the first light flux from the first light source and the second light flux from the second light source at different points corresponding to refractive longitudinal chromatic aberrations.

7. The optical pickup apparatus of claim 4, wherein the diffractive structure is provided on the objective lens and the objective lens is structured such that when the objective lens is compared with a non-diffractive objective lens having a refractive surface equal to that of the objective lens, a difference between a focal length of the first light flux having passed through the objective lens and a focal length of the second light flux having passed through the objective lens is made larger than a difference between a focal length of the first light flux having passed through the non-diffractive objective lens and a focal length of the second light flux having passed through the non-diffractive objective lens.

8. The optical pickup apparatus of claim 4, wherein the objective lens is structured such that a focal length of a second light flux having passed through the objective lens is made longer than a total length in which a refractive longitudinal chromatic aberration is added into a focal length of the first light flux having passed through the objective lens.

9. The optical pickup apparatus of claim 8, wherein the objective lens is structured such that a focal length of a second light flux having passed through the objective lens is made longer than 120% or more of a focal length of the first light flux having passed through the objective lens.

10. The optical pickup apparatus of claim 1, wherein the diffractive structure is structured to make an optical magnification of the converging optical system when the first light flux from the first light source has passed through to be different from an optical magnification when the second light flux from the second light source has passed through.

11. The optical pickup apparatus of claim 10, wherein the diffractive structure is structured to make a divergent angle or a converging angle of the first light flux which proceeds to be incident to the objective lens different from a divergent angle or a converging angle of the second light flux which proceeds to be incident to the objective lens.

12. The optical pickup apparatus of claim 10, wherein the converging optical system is structured to make an optical magnification when the second light flux from the second light source has passed through to be smaller than an optical magnification when the first light flux from the first light source has passed through.

13. The optical pickup apparatus of claim 1, wherein the converging optical system is structured to be able to record information for an information recording plane of the first optical information recording medium.

14. The optical pickup apparatus of claim 1, wherein the converging optical system is structured such that each of the first and second light fluxes having passed through the coupling lens proceeds to be incident into the objective lens as an infinite object distance light flux.

15. The optical pickup apparatus of claim 1, wherein the converging optical system is structured such that each of the first and second light fluxes having passed through the coupling lens proceeds to be incident into the objective lens as a divergent light flux of a finite object distance.

16. The optical pickup apparatus of claim 1, further comprising:
a spherical aberration correcting diffractive structure to correct a spherical aberration caused by a difference between the thickness t1 and the thickness t2.

17. An optical pickup apparatus, comprising:
a light source unit in which a first light source to emit a first light flux having a wavelength λ1 and a second light source to emit a second light flux having a wavelength λ2 (λ2>λ1) are mounted on a same base board;
a converging optical system to conduct recording or reproducing information for an information recording plane of a first optical information recording medium having a first protective base plate having a thickness t1 by converging the first light flux from the first light source on the information recording plane of the first optical information recording medium and to conduct recording or reproducing information for an information recording plane of a second optical information recording medium having a second protective base plate having a thickness t2 (t2>t1) by converging the second light flux from the second light source on the information recording plane of the second optical information recording medium;
wherein the converging optical system comprises,
a coupling lens into which the first light flux emitted from the first light source or the second light flux emitted from the second light source proceed to be incident;
an objective lens to converge the first or second light flux having passed through the coupling lens on the information recording plane of the first or second optical information recording medium; and
a diffractive structure which is structured such that a focal length of the first light flux from the first light source passing through the diffractive structure is different from a focal length of the second light flux from the second light source passing through the diffractive structure,
wherein the converging optical system is structured such that the first light flux having passed through the coupling lens proceeds to be incident into the objective lens as an infinite light flux and the second light flux having passed through the coupling lens proceeds to be incident into the objective lens as a divergent light flux of a finite object distance.

18. The optical pickup apparatus of claim 17, wherein when the light flux emitted from the second light source proceeds to be incident into the objective lens as a divergent light flux, a magnification of the objective lens for the divergent light flux satisfies the following formula:
−1/12<m<0.

19. An optical pickup apparatus, comprising:
a light source unit in which a first light source to emit a first light flux having a wavelength λ1 and a second light source to emit a second light flux having a wavelength λ2 (λ2>λ1) are mounted on a same base-board;
a converging optical system to conduct reproducing information for an information recording plane of a first optical information recording medium having a first protective base plate having a thickness t1 by converging the first light flux from the first light source on the information recording plane of the first optical information recording medium and to conduct recording or reproducing information for an information recording plane of a second optical information recording medium having a second protective base plate having a thickness t2 (t2>t1) by converging the second light flux from the second light source on the information recording plane of the second optical information recording medium;
wherein the converging optical system comprises,
a coupling lens into which the first light flux emitted from the first light source or the second light flux emitted from the second light source proceed to be incident; and
an objective lens to converge the first or second light flux having passed through the coupling lens on the information recording plane of the first or second optical information recording medium;
wherein the converging optical system further comprises a diffractive structure on at least an optical surface of the coupling lens, and
wherein the diffractive structure makes a divergent angle or a converging angle of the first light flux which proceeds to be incident to the objective lens different from a divergent angle or a converging angle of the second light flux which proceeds to be incident to the objective lens.

20. The optical pickup apparatus of claim 19, wherein the diffractive structure is structured to make a divergent angle or a converging angle of the first light flux proceeding to be incident into the objective lens to be smaller than a divergent angle or a converging angle of the second light flux proceeding to be incident into the objective lens.

21. The optical pickup apparatus of claim 19, wherein the diffractive structure is structured to make a divergent angle or a converging angle of the second light flux proceeding to be incident into the objective lens to be smaller than a divergent angle or a converging angle of the first light flux proceeding to be incident into the objective lens.

22. The optical pickup apparatus of claim 19, wherein the coupling lens is displaceable along the optical axis in accordance with a wavelength of each of the first and second light fluxes.

23. The optical pickup apparatus of claim 19, wherein each of the first and second light fluxes proceeding to be incident into the objective lens is a convergent light flux of a finite object distance.

24. The optical pickup apparatus of claim 19, wherein each of the first and second light fluxes proceeding to be incident into the objective lens is a divergent light flux of a finite object distance.

25. The optical pickup apparatus of claim 19, wherein one of the first and second light fluxes proceeding to be incident into the objective lens is a convergent light flux and the other one is a divergent light flux.

26. The optical pickup apparatus of claim 19, wherein one of the first and second light fluxes proceeding to be incident into the objective lens is a convergent light flux of a finite object distance and the other one is an infinite object distance light flux.

27. The optical pickup apparatus of claim 19, wherein one of the first and second light fluxes proceeding to be incident into the objective lens is a divergent light flux of a finite object distance and the other one is an infinite object distance light flux.

28. The optical pickup apparatus of claim 19, wherein the objective lens comprises a spherical aberration correcting diffractive structure to correct a spherical aberration caused by a difference between the thickness t1 and the thickness t2.

29. The optical pickup apparatus of claim 19, wherein the objective lens comprises a central region which includes an optical axis and is used for conducting recording or reproducing information for the information recording plane of both of the first optical information recording medium and the second optical information recording medium and a peripheral region which is provided at an outside of the central region and is used mainly for conducting reproducing information for the information recording plane of the first information recording medium.

30. The optical pickup apparatus of claim 29, wherein the central region of the objective lens comprises a spherical aberration correcting diffractive structure to correct a spherical aberration caused by a difference between the thickness t1 and the thickness t2.

31. The optical pickup apparatus of claim 30, wherein the central region of the objective lens has a paraxial refractive power.

32. The optical pickup apparatus of claim 19, wherein the converging optical system is structured to be able to change an optical magnification in accordance with a wavelength of light flux.

33. The optical pickup apparatus of claim 19, wherein the first light flux from the first light source and the second light flux from the second light source proceeding to be incident into the objective lens are one of an infinite object distance light flux, a converging light flux and a divergent light flux respectively and are adapted to proceed to be incident into the objective lens with respective different convergent or divergent angles.

34. The optical pickup apparatus of claim 19, wherein the objective lens is structured to focus the first light flux emitted from the first light source and the second light flux emitted from the second light source at an almost same point.

35. The optical pickup apparatus of claim 19, wherein the objective lens is structured to focus the first light flux from the first light source and the second light flux from the second light source at different points corresponding to refractive longitudinal chromatic aberrations.

36. The optical pickup apparatus of claim 19, wherein the objective lens is structured to make a divergent angle or a converging angle of the second light flux emitted from the second light source to be smaller than a divergent angle or a converging angle of the first light flux emitted from the second light source.

37. An objective lens for use in an optical pickup apparatus which comprises a light source unit in which a first light source to emit a first light flux having a wavelength $\lambda 1$ and a second light source to emit a second light flux having a wavelength $\lambda 2$ ($\lambda 2 > \lambda 1$) are mounted on a same base board; a converging optical system to conduct recording or reproducing information for an information recording plane of a first optical information recording medium having a first protective base plate having a thickness t1 by converging the first light flux from the first light source on the information recording plane of the first optical information recording medium and to conduct recording or reproducing information for an information recording plane of a second optical information recording medium having a second protective base plate having a thickness t2 (t2>t1) by converging the second light flux from the second light source on the information recording plane of the second optical information recording medium; a coupling lens into which the first light flux emitted from the first light source or the second light flux emitted from the second light source proceed to be incident;

wherein the objective lens converges the first or second light flux having passed through the coupling lens on the first or second optical information recording medium; and the objective lens comprises a diffractive structure on at least an optical surface of the objective lens, the diffractive structure being structured such that a focal length of the objective lens of the first light flux from the first light source passing through the diffractive structure is different from a focal length of the objective lens of the second light flux from the second light source passing through the diffractive structure, and wherein the converging optical system is structured such that the first light flux having passed through the coupling lens proceeds to be incident into the objective lens as an infinite light flux and the second light flux having passed through the coupling lens proceeds to be incident into the objective lens as a divergent light flux of a finite object distance.

38. The objective lens of claim 37, wherein the diffractive structure is structured such that the focal length of the second light flux from the second light source passing through the diffractive structure is made shorter than the focal length of the first light flux from the first light source passing through the diffractive structure.

39. The objective lens of claim 37, wherein the diffractive structure is structured such that the focal length of the second light flux from the second light source passing through the diffractive structure is made longer than the focal length of the first light flux from the first light source passing through the diffractive structure.

40. The objective lens of claim 37, wherein the objective lens is structured to focus the first light flux from the first light source and the second light flux from the second light source at an almost same point.

41. The objective lens of claim 40, wherein the objective lens is structured to focus the first light flux from the first light source and the second light flux from the second light source at different points corresponding to refractive longitudinal chromatic aberrations.

42. The objective lens of claim 37, wherein the diffractive structure is structured to make an optical magnification of the converging optical system when the first light flux from the first light source has passed through to be different from an optical magnification when the second light flux from the second light source has passed through.

43. The objective lens of claim 42, wherein the diffractive structure is structured to make a divergent angle or a converging angle of the first light flux which proceeds to be incident to the objective lens different from a divergent angle or a converging angle of the second light flux which proceeds to be incident to the objective lens.

44. The objective lens of claim 42, wherein the converging optical system is structured to make an optical magnification when the second light flux from the second light source has passed through to be smaller than an optical magnification when the first light flux from the first light source has passed through.

45. The objective lens of claim 37, wherein the objective lens is structured such that when the objective lens is compared with a non-diffractive objective lens having a refractive surface equal to that of the objective lens, a difference between a focal length of the first light flux having passed through the objective lens and a focal length of the second light flux having passed through the objective lens is made larger than a difference between a focal length of the first light flux having passed through the non-diffractive objective lens and a focal length of the second light flux having passed through the non-diffractive objective lens.

46. The objective lens of claim 37, wherein the objective lens is structured such that a focal length of a second light flux having passed through the objective lens is made longer than a total length in which a refractive longitudinal chromatic aberration is added into a focal length of the first light flux having passed through the objective lens.

47. The objective lens of claim 46, wherein the objective lens is structured such that a focal length of a second light flux having passed through the objective lens is made longer than 120% or more of a focal length of the first light flux having passed through the objective lens.

48. The objective lens of claim 37, wherein the converging optical system is structured to be able to record information for an information recording plane of the first optical information recording medium.

49. The objective lens of claim 41, wherein when the light flux emitted from the second light source proceeds to be incident into the objective lens as a divergent light flux, a magnification of the objective lens for the divergent light flux satisfies the following formula:

$-1/12 < m < 0$.

50. The objective lens of claim 37, further comprising:
a spherical aberration correcting diffractive structure to correct a spherical aberration caused by a difference between the thickness t1 and the thickness t2.

* * * * *